United States Patent [19]
Ochiai

[11] Patent Number: 5,317,570
[45] Date of Patent: May 31, 1994

[54] SYSTEM AND METHOD FOR LEARNING TRANSMISSION BAND OF MULTIPLEX PACKET

[75] Inventor: Tamiya Ochiai, Hachioji, Japan

[73] Assignee: Kabushiki Kaisha Toshiba, Kawasaki, Japan

[21] Appl. No.: 729,732

[22] Filed: Jul. 15, 1991

[30] Foreign Application Priority Data

Jul. 16, 1990 [JP] Japan .................................. 2-187673
Jul. 16, 1990 [JP] Japan .................................. 2-187674

[51] Int. Cl.$^5$ .............................................. H04J 3/24
[52] U.S. Cl. ..................................... 370/94.1; 370/79
[58] Field of Search ...................... 370/94.1, 60, 85.1, 370/85.2, 84, 17, 79, 94.2, 60.1, 13

[56] References Cited

U.S. PATENT DOCUMENTS

| | | | |
|---|---|---|---|
| 4,912,702 | 3/1990 | Verbiest | 370/94.1 |
| 5,027,351 | 6/1991 | DePrycker et al. | 370/100.1 |
| 5,081,620 | 1/1992 | Girard et al. | 370/94.1 |
| 5,128,932 | 7/1992 | Li | 370/94.1 |

*Primary Examiner*—Douglas W. Olms
*Assistant Examiner*—Shick Hom
*Attorney, Agent, or Firm*—Finnegan, Henderson, Farabow, Garrett & Dunner

[57] ABSTRACT

A multiplex-packet band learning system and method wherein management of the transmission band of a trunk suitable for an actual packet communication amount can be established to contribute to efficient multiplex packet communication. The number of communication packets per unit time for each medium pattern corresponding one of combinations of call terminal attributes is measured for the trunk interface of each exchange, a normal distribution of the numbers of communication packets in actual communication is estimated on the basis of the measured number of communication packets per unit time for each medium pattern, and its estimated value is updatingly held as index data of permission or prohibition of a new call registration. The number of communication packets in the actual communication is measured at a terminal interface so that a terminal band table for the terminal interface has packet rates at which the terminal has been so far communicated, mean and variance values of the past packet rates are calculated on the basis of the actually measured number of communication packets, a normal distribution is estimated at packet rate estimation circuits PPLs of a controller with use of its measured statistical data, and it is judged whether the packet communication of a call requiring the registration to the corresponding trunk line is permitted or prohibited.

14 Claims, 27 Drawing Sheets

CALL MESSAGE

COMMUNICATION PACKET

MPR(303)

MPCT (305)

| (FLG) LIMIT FLAG | (ME1) MEDIUM 1 TRAFFIC | (ME2) MEDIUM 2 TRAFFIC | (ME3) MEDIUM 3 TRAFFIC | | TOTAL OCCURRENCE FREQUENCY(N) | TOTAL PACKET RATE SUM($\Sigma$) | TOTAL PACKET RATE SQUARED- SUM($\Sigma^2$) |
|---|---|---|---|---|---|---|---|
| 0 | 0 | 0 | 4 | --- | 10 | 11220 | 218256 |
| 1 | 0 | 1 | 3 | --- | 3 | 22325 | 356823 |
| --- | --- | --- | --- | | --- | --- | |

FIG.10 t(N-1, α1) TABLE

| φ \ a | 0.50 | 0.25 | 0.10 | 0.05 | 0.025 | 0.01 | 0.005 |
|---|---|---|---|---|---|---|---|
| 1 | 1.00000 | 2.4142 | 6.3138 | 12.706 | 25.452 | 63.657 | 127.32 |
| 2 | 0.81650 | 1.6036 | 2.9200 | 4.3027 | 6.2053 | 9.9248 | 14.089 |
| 3 | 0.76489 | 1.4226 | 2.3534 | 3.1825 | 4.1765 | 5.8409 | 7.4533 |
| 4 | 0.74070 | 1.3444 | 2.1318 | 2.7764 | 3.4954 | 4.6041 | 5.5976 |
| 5 | 0.72669 | 1.3009 | 2.0150 | 2.5706 | 3.1634 | 4.0321 | 4.7733 |
| 6 | 0.71756 | 1.2733 | 1.9432 | 2.4469 | 2.9687 | 3.7074 | 4.3168 |
| 7 | 0.71114 | 1.2543 | 1.8945 | 2.3646 | 2.8412 | 3.4995 | 4.0293 |
| 8 | 0.70639 | 1.2403 | 1.8595 | 2.3060 | 2.7515 | 3.3554 | 3.8325 |
| 9 | 0.70272 | 1.2297 | 1.8331 | 2.2622 | 2.6850 | 3.2498 | 3.6897 |
| 10 | 0.69981 | 1.2213 | 1.8125 | 2.2281 | 2.6338 | 3.1693 | 3.5814 |
| 11 | 0.69745 | 1.2145 | 1.7959 | 2.2010 | 2.5931 | 3.1058 | 3.4966 |
| 12 | 0.69548 | 1.2089 | 1.7823 | 2.1788 | 2.5600 | 3.0545 | 3.4284 |
| 13 | 0.69384 | 1.2041 | 1.7709 | 2.1604 | 2.5326 | 3.0123 | 3.3725 |
| 14 | 0.69242 | 1.2001 | 1.7613 | 2.1448 | 2.5096 | 2.9768 | 3.3257 |
| 15 | 0.69120 | 1.1967 | 1.7530 | 2.1315 | 2.4899 | 2.9467 | 3.2860 |
| 16 | 0.69013 | 1.1937 | 1.7459 | 2.1199 | 2.4729 | 2.9208 | 3.2520 |
| 17 | 0.68919 | 1.1910 | 1.7396 | 2.1098 | 5.4581 | 2.8982 | 3.2225 |
| 18 | 0.68837 | 1.1887 | 1.7341 | 2.1009 | 2.4450 | 2.8784 | 3.1966 |
| 19 | 0.68763 | 1.1866 | 1.7291 | 2.0930 | 2.4334 | 2.8609 | 3.1737 |
| 20 | 0.68696 | 1.1848 | 1.7247 | 2.0860 | 2.4231 | 2.8453 | 3.1534 |
| 21 | 0.68635 | 1.1831 | 1.7207 | 2.0796 | 2.4138 | 2.8314 | 3.1352 |
| 22 | 0.68580 | 1.1816 | 1.7171 | 2.0739 | 2.4055 | 2.8188 | 3.1188 |
| 23 | 0.68531 | 1.1802 | 1.7139 | 2.0687 | 2.3979 | 2.8073 | 3.1040 |
| 24 | 0.68485 | 1.1789 | 1.7109 | 2.0639 | 2.3910 | 2.7969 | 3.0905 |
| 25 | 0.68443 | 1.1777 | 1.7081 | 2.0595 | 2.3846 | 2.7874 | 3.0782 |
| 26 | 0.68405 | 1.1766 | 1.7056 | 2.0555 | 2.3788 | 2.7787 | 3.0669 |
| 27 | 0.68370 | 1.1757 | 1.7033 | 2.0518 | 2.3734 | 2.7707 | 3.0565 |
| 28 | 0.68335 | 1.1748 | 1.7011 | 2.0484 | 2.3685 | 2.7633 | 3.0469 |
| 29 | 0.68304 | 1.1739 | 1.6991 | 2.0452 | 2.3638 | 2.7564 | 3.0380 |
| 30 | 0.68276 | 1.1731 | 1.6973 | 2.0423 | 2.3596 | 2.7500 | 3.0298 |
| 40 | 0.68066 | 1.1673 | 1.6839 | 2.0211 | 2.3289 | 2.7045 | 2.9712 |
| 60 | 0.67862 | 1.1616 | 1.6707 | 2.0003 | 2.2991 | 2.6603 | 2.9146 |
| 120 | 0.67656 | 1.1559 | 1.6577 | 1.9799 | 2.2699 | 2.6174 | 2.8599 |
| | 0.67449 | 1.1503 | 1.6449 | 1.9600 | 2.2414 | 2.5758 | 2.8070 |

α1 VALVE

SAMPLE NUMBER
N=10
N-1=9
α1=0.01

INPUT N-1 → TO ESTIMATION CIRCUIT
OUTPUT t(N-1, α1) ←

FIG. 11

| N-1 \ a | .995 | .990 | .975 | .950 | .900 | .750 |
|---|---|---|---|---|---|---|
| 1 | $392704 \cdot 10^{-10}$ | $157088 \cdot 10^{-9}$ | $982069 \cdot 10^{-9}$ | $393214 \cdot 10^{-8}$ | 0.0157908 | 0.1015308 |
| 2 | 0.0100251 | 0.0201007 | 0.0506356 | 0.102587 | 0.210720 | 0.575364 |
| 3 | 0.0717212 | 0.114832 | 0.215795 | 0.351846 | 0.584375 | 1.212534 |
| 4 | 0.206990 | 0.297110 | 0.484419 | 0.710721 | 1.063623 | 1.92255 |
| 5 | 0.411740 | 0.554300 | 0.831211 | 1.145476 | 1.61031 | 2.67460 |
| 6 | 0.675727 | 0.872085 | 1.237347 | 1.63539 | 2.20413 | 3.45460 |
| 7 | 0.989265 | 1.239043 | 1.68987 | 2.16735 | 2.83311 | 4.25485 |
| 8 | 1.344419 | 1.646482 | 2.17973 | 2.73264 | 3.48954 | 5.07064 |
| 9 | (1.734926) | 2.087912 | 2.70039 | 3.32511 | 4.16816 | 5.89883 |
| 10 | 2.15585 | 2.55821 | 3.24697 | 3.94030 | 4.86518 | 6.73720 |
| 11 | 2.60321 | 3.05347 | 3.81575 | 4.57481 | 2.57779 | 7.58412 |
| 12 | 3.07382 | 3.57056 | 4.40379 | 5.22603 | 6.30380 | 8.43842 |
| 13 | 3.56503 | 4.10691 | 5.00874 | 5.89186 | 7.04150 | 9.29906 |
| 14 | 4.07468 | 4.66043 | 5.62872 | 6.57063 | 7.78953 | 10.1653 |
| 15 | 4.60094 | 5.22935 | 6.26214 | 7.26094 | 8.54675 | 11.0365 |
| 16 | 5.14224 | 5.81221 | 6.90766 | 7.96164 | 9.31223 | 11.9122 |
| 17 | 5.69724 | 6.40776 | 7.56418 | 8.67176 | 10.0852 | 12.7919 |
| 18 | 6.26481 | 7.01491 | 8.23075 | 9.39046 | 10.8649 | 13.6753 |
| 19 | 6.84398 | 7.63273 | 8.90655 | 10.1170 | 11.6509 | 14.5620 |
| 20 | 7.43386 | 8.26040 | 9.59083 | 10.8508 | 12.4426 | 15.4518 |
| 21 | 8.03366 | 8.89720 | 10.28293 | 11.5913 | 13.2396 | 16.3444 |
| 22 | 8.64272 | 9.54249 | 10.9823 | 12.3380 | 14.0415 | 17.2396 |
| 23 | 9.26042 | 10.19567 | 11.6885 | 13.0905 | 14.8479 | 18.1373 |
| 24 | 9.88623 | 10.8564 | 12.4011 | 13.8484 | 15.6587 | 19.0372 |
| 25 | 10.5197 | 11.5240 | 13.1197 | 14.6114 | 16.4734 | 19.9393 |
| 26 | 11.1603 | 12.1981 | 13.8439 | 15.3791 | 17.2919 | 20.8434 |
| 27 | 11.8076 | 12.8786 | 14.5733 | 16.1513 | 18.1138 | 21.7494 |
| 28 | 12.4613 | 13.5648 | 05.3079 | 16.9279 | 18.9392 | 22.6572 |
| 29 | 13.1211 | 14.2565 | 16.0471 | 17.7083 | 19.7677 | 23.5666 |
| 30 | 13.7867 | 14.9535 | 16.7908 | 18.4926 | 20.5992 | 24.4776 |
| 40 | 20.7065 | 22.1643 | 24.4331 | 26.5093 | 29.0505 | 33.6603 |
| 50 | 27.9907 | 29.7067 | 32.3574 | 34.7642 | 37.6886 | 42.9421 |
| 60 | 35.5346 | 37.4848 | 40.4817 | 43.1879 | 46.4589 | 52.2938 |
| 70 | 43.2752 | 45.4418 | 48.7576 | 51.7393 | 55.3290 | 61.6983 |
| 80 | 51.1720 | 53.5400 | 57.1532 | 60.3915 | 64.2778 | 71.1445 |
| 90 | 59.1963 | 61.7541 | 65.6466 | 69.1260 | 73.2912 | 80.6247 |
| 100 | 67.3276 | 70.0648 | 74.2219 | 77.9295 | 82.3581 | 90.1332 |

α2 VALVE

INPUT N-1 →

TO ESTIMATION CIRCUIT

← OUPUT $X^2_{(N-1, 1-\frac{\alpha 2}{2})}$

○ α2 = 0.01

$1 - \frac{\alpha 2}{2} = 0.995$

○ N-1 = 9

$X2(N-1, 1-\frac{\alpha 2}{2})$ TABLE

FIG. 12

| Z | .00 | .01 | .02 | .03 | .04 | 0.5 | 0.6 | 0.7 | 0.8 | 0.9 |
|---|-----|-----|-----|-----|-----|-----|-----|-----|-----|-----|
| 0.0 | .0000 | .0040 | .0080 | .0120 | .0160 | .0199 | .0239 | .0279 | .0319 | .0359 |
| 0.1 | .0398 | .0438 | .0478 | .0517 | .0557 | .0596 | .0636 | .0675 | .0714 | .0753 |
| 0.2 | .0793 | .0832 | .0871 | .0910 | .0948 | .0987 | .1026 | .1064 | .1103 | .1141 |
| 0.3 | .1179 | .1217 | .1255 | .1293 | .1331 | .1368 | .1406 | .1443 | .1480 | .1517 |
| 0.4 | .1554 | .1591 | .1628 | .1664 | .1700 | .1736 | .1772 | .1808 | .1844 | .1879 |
| 0.5 | .1915 | .1950 | .1985 | .2019 | .2054 | .2088 | .2123 | .2157 | .2190 | .2224 |
| 0.6 | .2257 | .2291 | .2324 | .2357 | .2389 | .2422 | .2454 | .2486 | .2517 | .2549 |
| 0.7 | .2580 | .2611 | .2642 | .2673 | .2703 | .2734 | .2764 | .2794 | .2823 | .2852 |
| 0.8 | .2881 | .2910 | .2939 | .2967 | .2995 | .3023 | .3051 | .3078 | .3106 | .3133 |
| 0.9 | .3150 | .3186 | .3212 | .3238 | .3264 | .3289 | .3315 | .3340 | .3365 | .3389 |
| 1.0 | .3413 | .3438 | .3461 | .3485 | .3508 | .3531 | .3554 | .3577 | .3599 | .3621 |
| 1.1 | .3643 | .3665 | .3686 | .3708 | .3729 | .3749 | .3770 | .3700 | .3810 | .3830 |
| 1.2 | .3849 | .3869 | 3888 | .3907 | .3925 | .3944 | .3962 | .3980 | .3997 | .4015 |
| 1.3 | .4032 | .4049 | .4066 | .4082 | .4099 | .4115 | .4131 | .4147 | .4162 | .4177 |
| 1.4 | .4192 | .4207 | .4222 | .4236 | .4251 | .4265 | .4270 | .4292 | .4306 | .4319 |
| 1.5 | .4332 | .4345 | .4357 | .4370 | .4382 | .4394 | .4406 | .4418 | .4429 | .4441 |
| 1.6 | .4452 | .4463 | .4474 | .4484 | .4495 | .4505 | .4515 | .4525 | .4535 | .4545 |
| 1.7 | .4554 | 4564 | .4573 | .4582 | .4591 | .4599 | .4608 | .4616 | .4625 | .4633 |
| 1.8 | .4641 | .4649 | .4656 | .4664 | .4671 | .4678 | .4685 | .4693 | .4699 | .4706 |
| 1.9 | .4713 | .4719 | .4726 | .4732 | .4738 | .4744 | .4750 | .4756 | .4761 | .4767 |
| 2.0 | .4772 | .4778 | .4783 | .4788 | .4793 | .4798 | .4803 | .4808 | .4812 | .4817 |
| 2.1 | .4821 | .4826 | .4830 | .4834 | .4838 | .4842 | .4846 | .4850 | .4854 | .4857 |
| 2.2 | .4861 | .4864 | .4868 | .4871 | .4875 | .4878 | .4881 | .4884 | .4887 | .4890 |
| 2.3 | .4893 | .4896 | .4898 | .4901 | .4904 | .4906 | .4909 | .4911 | .4913 | .4916 |
| 2.4 | .4918 | .4920 | .4922 | .4925 | .4927 | .4929 | .4931 | .4932 | .4934 | .4936 |
| 2.5 | .4938 | .4940 | .4941 | .4943 | .4945 | .4946 | .4948 | .4949 | .4951 | .4952 |
| 2.6 | .4953 | .4955 | .4956 | .4957 | .4959 | .4960 | .4961 | .4962 | .4963 | .4964 |
| 2.7 | .4965 | .4966 | .4967 | .4968 | .4969 | .4970 | .4971 | .4972 | .4973 | .4974 |
| 2.8 | .4974 | .4975 | .4976 | .4977 | .4977 | .4978 | .4979 | .4979 | .4980 | .4981 |
| 2.9 | .4981 | .4982 | .4982 | .4983 | .4984 | .4984 | .4985 | .4985 | .4986 | .4986 |
| 3.0 | .4987 | .4987 | .4987 | .4988 | .4988 | .4989 | .4989 | .4989 | .4990 | .4990 |

REQUEST →

TO ESTIMATION CIRCUIT

← OUTPUT N($\alpha$3)

$\alpha$3 VALUE $\alpha$3=0.01
(1-0.4949 x2)

N($\alpha$3) TABLE

FIG. 13

MUT (307)

| INDEX | MEDIUM PACKET RATE |
|---|---|
| MEDIUM 1 | V1 (PACKET/UNIT TIME) |
| MEDIUM 2 | V2 (PACKET/UNIT TIME) |
| MEDIUM 3 | V3 (PACKET/UNIT TIME) |
| ⋮ | ⋮ |

FIG.14

MPCT (INITIAL VALUE)

| Idx | FLG | ME1 | ME2 | ME3 | N | Σ | Σ² |
|---|---|---|---|---|---|---|---|
| 0 | | | | | | | |
| ⋮ | 1 | 10 | 8 | 1 | 0 | 0 | 0 |
| 64 | | | | | | | |

FIG. 15(a)

WHEN ESTIMATE φ VALUE=g, I.E., SAMPLE NUMBER N=10, MEDIUM PATTERN (10,8,1···) OCCURS 10 TIMES

| | | | | | | |
|---|---|---|---|---|---|---|
| 1 | 10 | 8 | 1 | 10 | 10325 | 11096892 |

FIG. 15(b)

PATTERN ADDITION $\left(\begin{array}{c}\alpha^1=\alpha^2=\alpha^3=0.01\\ A=1730.27\end{array}\right)$

| | | | | | | |
|---|---|---|---|---|---|---|
| 0 | 10 | 8 | 1 | 10 | 10325 | 11096892 |
| | | | | | | |

| Idx | FLG | ME1 | ME2 | ME3 | N | Σ | Σ² |
|---|---|---|---|---|---|---|---|
| 65 | 1 | 10 | 11 | 2 | 0 | 0 | 0 |
| ⋮ | 1 | 10 | 11 | 3 | 0 | 0 | 0 |

FIG. 15(c)

MEDIUM PATTERN/PACKET RATE DISTRIBUTION
(NORMAL DISTRIBUTION ESTIMATION)

FIG. 21

603 TERMINAL BAND TABLE (TBTi)

| MEASURING FREQUENCY | PACKET RATE VALUE SUM | PACKET RATE VALUE SQUARED-SUM | MEAN VALUE | VARIANCE VALUE | INITIAL PACKET RATE VALUE | STATISTICAL-PROCESSING START THRESHOLD VALUE |
|---|---|---|---|---|---|---|
| ni | Σi | Σ²i | Ei | Vi | Bi | Δi |

FIG. 23

903 TRUNK j REGISTRATION CALL TABLE (TRTj)

| CALL NUMBER | SEND/RECEIVE TERMINAL NUMBER | Ei | Vi |
|---|---|---|---|
| 0 | 110, 111 | Eo | Vo |
| 1 | --- | --- | --- |
| 2 | --- | --- | --- |
| CN | NO INPUT | | |

| Z | .00 | .01 | .02 | 0.3 | .04 | 0.5 | 0.6 | 0.7 | 0.8 | 0.9 |
|---|---|---|---|---|---|---|---|---|---|---|
| 0.0 | .0000 | .0040 | .0080 | .0120 | .0160 | .0199 | .0239 | .0279 | .0319 | .0359 |
| 0.1 | .0398 | .0438 | .0478 | .0517 | .0557 | .0596 | .0636 | .0675 | .0714 | .0753 |
| 0.2 | .0793 | .0832 | .0871 | .0910 | .0948 | .0987 | .1026 | .1064 | .1103 | .1141 |
| 0.3 | .1179 | .1217 | .1255 | .1293 | .1331 | .1368 | .1406 | .1443 | .1480 | .1517 |
| 0.4 | .1554 | .1591 | .1628 | .1664 | .1700 | .1736 | .1772 | .1808 | .1844 | .1879 |
| 0.5 | .1915 | .1950 | .1985 | .2019 | .2054 | .2088 | .2123 | .2157 | .2190 | .2224 |
| 0.6 | .2257 | .2291 | .2324 | .2357 | .2389 | .2422 | .2454 | .2486 | .2517 | .2549 |
| 0.7 | .2580 | .2611 | .2642 | .2673 | .2703 | .2734 | .2764 | .2794 | .2823 | .2852 |
| 0.8 | .2881 | .2910 | .2939 | .2967 | .2995 | .3023 | .3051 | .3078 | .3106 | .3133 |
| 0.9 | .3150 | .3186 | .3212 | .3238 | .3264 | .3289 | .3315 | .3340 | .3365 | .3389 |
| 1.0 | .3413 | .3438 | .3461 | .3485 | .3508 | .3531 | .3554 | .3577 | .3599 | .3621 |
| 1.1 | .3643 | .3665 | .3686 | .3708 | .3729 | .3749 | .3770 | .3700 | .3810 | .3830 |
| 1.2 | .3849 | .3869 | .3888 | .3907 | .3925 | .3944 | .3962 | .3980 | .3997 | .4015 |
| 1.3 | .4032 | .4049 | .4066 | .4082 | .4099 | .4115 | .4131 | .4147 | .4162 | .4177 |
| 1.4 | .4192 | .4207 | .4222 | .4236 | .4251 | .4265 | .4270 | .4292 | .4306 | .4319 |
| 1.5 | .4332 | .4345 | .4357 | .4370 | .4382 | .4394 | .4406 | .4418 | .4429 | .4441 |
| 1.6 | .4452 | .4463 | .4474 | .4484 | .4495 | .4505 | .4515 | .4525 | .4535 | .4545 |
| 1.7 | .4554 | .4564 | .4573 | .4582 | .4591 | .4599 | .4608 | .4616 | .4625 | .4633 |
| 1.8 | .4641 | .4649 | .4656 | .4664 | .4671 | .4678 | .4685 | .4693 | .4699 | .4706 |
| 1.9 | .4713 | .4719 | .4726 | .4732 | .4738 | .4744 | .4750 | .4756 | .4761 | .4767 |
| 2.0 | .4772 | .4778 | .4783 | .4788 | .4793 | .4798 | .4803 | .4808 | .4812 | .4817 |
| 2.1 | .4821 | .4826 | .4830 | .4834 | .4838 | .4842 | .4846 | .4850 | .4854 | .4857 |
| 2.2 | .4861 | .4864 | .4868 | .4871 | .4875 | .4878 | .4881 | .4884 | .4887 | .4890 |
| 2.3 | .4893 | .4896 | .4898 | .4901 | .4904 | .4906 | .4909 | .4911 | .4913 | .4916 |
| 2.4 | .4918 | .4920 | .4922 | .4925 | .4927 | .4929 | .4931 | .4932 | .4934 | .4936 |
| 2.5 | .4938 | .4940 | .4941 | .4943 | .4945 | .4946 | .4948 | .4949 | .4951 | .4952 |
| 2.6 | .4953 | .4955 | .4956 | .4957 | .4959 | .4960 | .4961 | .4962 | .4963 | .4964 |
| 2.7 | .4965 | .4966 | .4967 | .4968 | .4969 | .4970 | .4971 | .4972 | .4973 | .4974 |
| 2.8 | .4974 | .4975 | .4976 | .4977 | .4977 | .4978 | .4979 | .4979 | .4980 | .4981 |
| 2.9 | .4981 | .4982 | .4982 | .4983 | .4984 | .4984 | .4985 | .4985 | .4986 | .4986 |
| 3.0 | .4987 | .4987 | .4987 | .4988 | .4988 | .4989 | .4989 | .4989 | .4990 | .4990 |

TO 803
NO.1
← 2.57

α ≒ 0.01
(1- 0.4949
× 2)

NO.1 TABLE

FIG. 30

SYSTEM AND METHOD FOR LEARNING TRANSMISSION BAND OF MULTIPLEX PACKET

BACKGROUND OF THE INVENTION

1. Field of the Invention

The present invention relates to a system and method for learning the transmission band of a multiplex packet transmitted through a trunk of a packet exchange or an asynchronous transmission mode exchange.

2. Description of the Related Art

Referring to FIG. 1, there is shown a functional block diagram of a general packet exchange system, in which a terminal 110 belongs to a packet exchange 100 with which a packet exchange 100' is connected through a trunk 109, and a terminal 111 belongs to the packet exchange 100'.

Assume now that the terminal 110 generates a communication request directed to the terminal 111. In this case, prior to its communication, the terminal 110 informs a controller 101 provided in the exchange 100 of a call message via a call signal line 105. The controller 101, in response to the call message, secures the necessary communication route, communication channel, etc. between the terminals 110 and 111 and informs the adjacent exchange 100' of the call message through a call signal line 107 of the trunk 109 according to preset route information on different destinations, while performing various sorts of controls to be described later.

On the side of the adjacent exchange 100', a controller 101' in the exchange 100', when receiving the aforementioned call message, secures the necessary communication route and channel up to the destination terminal 111 and informs the terminal 111 of the call message through a call signal line 105'.

Thereafter, when it is desired to perform a packet communication between the terminals 110 and 111, the packet communication is carried out in accordance with the communication route set by the exchange 100 based on the call message received from the terminal 110.

More specifically, when the terminal 110 is sending a packet through a data line 106 to a trunk interface 103 for example, the exchange 100 functions to further transmit the packet from the trunk interface 103 through a trunk interface 103' of the opposing exchange 100' to the terminal 111. In this connection, if another packet is already being transmitted through the corresponding trunk, then the packet to be next transmitted is once stored in a memory 102-for later transmission after the trunk becomes not in use.

Shown in FIG. 2 is an exemplary format of the call message used in this sort of packet transmission control, and FIG. 3 shows the structure of a packet actually transmitted in the control.

In FIG. 2, the illustrated call message comprises a call number for identification in a call exchange; a message code indicative of the sort of the message such as, e.g., '01' (call setting), '02' (call acceptance) or '03' (call release)(in the case of the call acceptance and release, constituent data which will be explained become unnecessary); destination number data indicative of a destination exchange number and a destination terminal number; a seized-channel number seized as the corresponding terminal line or trunk according to the route data with respect to the destination number of the packet receiver; a medium code indicative of the medium type of the communication terminal as the call-message issuer such as, e.g., '01' (voice), '02' (data) or '03' (television conference terminal); a request packet rate (for example, 125 packets/sec.) required by the call message; and additional data such as other terminal communication attributes.

FIG. 4 shows a functional structure of the controller 101 of the prior art exchange for processing such a call message as containing these data elements. In operation of the controller 101, when a 'call setting' message is supplied to a call message buffer 201 of the controller 101 in the exchange through the call signal line 105, this causes the buffer 201 to send a request packet rate to a subtracter 210 through a signal line 209. At the same time, the subtracter 210 also receives an output of a residual-trunk- capacity register 204 through a signal line 208. The output of the residual-trunk-capacity register 204 indicates the current residual trunk capacity value which is set as its initial value at a maximum packet rate value of associated one of trunks predetermined for each trunk and which is sequentially modified through such control as to be described later. The subtracter 210 performs a subtraction of the residual trunk capacity value minus the request packet rate value and applies its subtraction result to a comparator 203. The comparator 203 compares the received subtraction result with zero.

When the subtraction result is equal to or larger than zero, the comparator 203 applies the subtraction result through a signal line 207 to the residual-trunk- capacity register 204 to modify the residual trunk capacity value. The comparator 203 also informs the trunk interface 103 and the terminal interface 104 of a 'call acceptance' message via a signal line 205, the call message buffer 201 and the other of the call signal line 105 for call registration.

On the other hand, when the aforementioned subtraction result value is smaller than zero, the comparator 203 cancels the subtraction result value and informs the terminal interface 104 of a 'call release' message via a signal line 206, the call message buffer 201 and the call signal line 105 for call release. In this case, the residual trunk capacity value is kept at the previous value. Thereafter, if the call is accepted, then a packet communication is carried out between the terminals 110 and 111.

As has been already explained above, the exemplary format of the communication packet is expressed, as shown in FIG. 3, in terms of the channel number seized at the time of the call setting and communication data.

Using communication packets having such a format as mentioned above, packet communication is carried out between the terminal 110 and the exchange 100 and between the exchanges 100 and 1001. At this time, when the exchange 100 temporarily receives many packets from its terminals, the exchange 100 might not be able to immediately send them to the trunk 109. For the purpose of avoiding such a situation, such packets are temporarily stored in the memory 102 (refer to FIG. 1) of the exchange 100 so that as the trunk 109 becomes empty, the packets stored in the memory 102 are sent onto the trunk 109.

Shown in FIG. 5 is a transmission characteristic showing how to transmit each call generated based on such conventional control operation.

It will be clear from FIG. 5 that, in the prior art, the request packet rate at the stage of the call setting is set usually at the maximum transmission packet rate (in other words, transmission bearer rate), which results in that the request packet rate becomes extremely large when compared with the packet rate (measured packet rate) at which communication is actually effected. In other words, the transmission characteristic of the trunk through which such requested calls are multiplexed has such an idle band as shown in FIG. 5.

Such transmission characteristic adversely affects greatly a communication efficiency. For this reason, it has been impossible to realize such effect unique to the packet multiplex communication as obtained, e.g., when a call communication packet becomes temporarily idle, by transmitting another communication packet during the temporary idle period.

In this way, the prior art system of managing the transmission band of multiplex packets is arranged so that when a terminal issues a communication request, its residual trunk capacity is found usually on the basis of the request packet rate given as the maximum packet rate of the associated terminal so that a call is accepted during zero or more of the residual trunk capacity. As a result, the prior art system has had such a problem that not only the request trunk capacity per call becomes much larger than the actual packet communication amount (traffic) of the trunk per call in the actual communication but also the packet multiplex effect of the trunk cannot be obtained, thus making it impossible to manage and operate the trunk transmission band efficiently.

SUMMARY OF THE INVENTION

It is therefore an object of the present invention to provide a system and method of learning the transmission band of a multiplex packet, which can establish management of the transmission band of a trunk suitable for the actual packet communication amount (traffic), thus contributing to efficient multiplex packet communication.

The multiplex-packet band learning system and method in accordance with the present invention are featured in that the number of communication packets per unit time for each medium pattern corresponding one of combinations of call terminal attributes is measured for the trunk interface of each exchange, a normal distribution of the numbers of communication packets in actual communication is estimated on the basis of the measured number of communication packets per unit time for each medium pattern, and its estimated value is updatingly held as index data of permission or prohibition of a new call registration.

To this end, the present invention is arranged as follows.

First, a counter for measuring the number of packets per unit time is provided in the trunk interface of each packet exchange. A controller in each packet exchange is provided therein with a medium pattern register, a medium pattern control table, a normal estimation circuit and a medium/reference packet rate table to allow learning of the transmission band of a multiplex packet on the trunk. The medium pattern register is used to store therein traffic patterns (such, for example, as telephone terminal traffic patterns and television terminal traffic patterns, which will be referred to as the medium patterns, hereinafter) for different medium codes of the current call.

The medium pattern control table previously stores therein as limit medium patterns the maximum number of combinations from the maximum number of the communication packets per unit time previously registered for each medium as the initial values of the maximum medium patterns registerable for the trunk. When the medium traffic reaches the limit medium pattern during exchanging operation, a predetermined upper limit of significance level (risk rate) based on normal distribution estimation of past packet number samples measured per unit times at the trunk interface is given as a residual trunk capacity band, additions of combination patterns@of the maximum medium traffics addible for the residual trunk capacity band to the limit medium patterns are all combined to be replaced by limit medium patterns as new limit medium patterns, whereby the contents of the table are sequentially learned as the limit medium patterns.

The normal estimation circuit is provided to estimate the residual trunk capacity band on the basis of the number of packet samples per unit time measured at the trunk interface for each medium pattern.

The normal estimation circuit, in particular, when finding the combination medium pattern of the maximum terminal traffic addible for the residual traffic capacity band in the above estimation, has such a control parameter that allows a combination medium pattern to be regarded as the combination medium pattern of the maximum medium traffic if the residual trunk capacity band is between the normal distribution estimate value of samples of that combination medium pattern and a region slightly smaller than the estimate value.

In order to avoid abnormal estimation with use of a very small number of samples, the normal estimation circuit has also an estimation $\phi$ value register which instructs to set the number of samples at a value that is equal to or larger than a preset value.

The medium/reference packet rate table is used to register therein reference packet numbers per unit time for respective media to determine the combination pattern of the maximum medium traffic addible for the residual trunk capacity.

In the present invention, when the maximum traffic pattern (medium pattern) of the medium code registerable for the trunk is used as a limit medium pattern, the maximum combination medium patterns registerable for the trunk determined by the maximum numbers of communication packets per unit time for different media are previously stored as their initial values so that, when the medium traffic reaches the limit medium pattern during exchanging operation, a predetermined upper limit of significance level is provided as the residual trunk capacity band through the normal distribution estimation based on the past packet number samples measured per unit time at the trunk interface, additions of the maximum medium traffic combination patterns addible to the residual trunk capacity band to the corresponding limit medium pattern are all combined, the corresponding limit medium pattern is additively replaced by a new limit medium pattern, whereby the contents are sequentially learned as the limit medium pattern.

Through this learning operation, the actually measured values of the communication packet number of the medium pattern actually occurred in the past are used in the judgment of the new call registration so that the registered traffic is set to be suitable for the actual communication packet amount, thereby realizing the efficient use of the trunk transmission band.

In the case where it is desired to find the maximum terminal traffic combination pattern addible for the residual trunk capacity band, the learning divergence, which might occur through the statistical processing of the measured samples, can be prevented and stable convergence can be realized, because the control parameter is provided which, when the residual trunk capacity band is between the normal distribution estimate value of samples for each medium pattern and a very small region smaller therethan, regards it as the maximum medium traffic combination pattern.

Further, since there is provided an estimate $\phi$ value register which sets the number of samples at a value that is equal to or larger than a preset value to avoid the learning operation with use of improper estimate values, abnormal estimation based on a very small number of samples can be inhibited from being performed.

The multiplex-packet band learning system and method are featured in that the number of communication packets per unit time on the corresponding terminal line is measured for each exchange terminal interface, a normal distribution of the communication packet numbers in actual communication is estimated with use of mean and variance values of the measured communication packets, and its estimated value is updatingly held as index data of new-call registration permission/prohibition.

To carry out the above learning system, in accordance with the present invention, the terminal interface comprises a counter for measuring the number of communication packets; a timer for timing the unit time of count-value collection of the counter; a terminal band table for holding therein mean and variance values of the packet number values calculated based on the collected packet number values per unit time (packet rate), an initial packet rate value obtained from bit clocks applied to the terminal, and statistical-processing start threshold values for determining whether the initial packet rate value is used as a band value or a statistical value of the collected packet rates is used therefor, etc.; a microprocessor and its program for generating the terminal band table or substituting the mean and variance values in the table for the request packet rate value in the calling message for transmission to the controller.

The controller comprises a packet rate estimation circuit (PPL) for estimating the multiplex packet rate of the trunk line on the basis of the packet rates of respective terminals for the call as circuit for judging whether the call received from the terminal is to be accepted for the trunk line corresponding to the destination of the call, and an estimation correction circuit for performing such correction as to return the packet rate of the registered terminal to its initial packet rate when remarkable packet discard takes place in the communication of the call registered through the estimation.

The memory comprises a counter for counting the number of discard packets occurred when the number of packets transmitted exceeds the memory capacity allocated to each trunk, a microprocessor and its program for carrying out estimation correction when the count value of the counter exceeds a preset threshold value.

In the present invention, the number of communication packets in the actual communication is measured at a terminal interface so that a terminal band table for the terminal interface has mean and variance values of packet rates at which the terminal has been so far communicated, the mean and variance values of the past packet rates are calculated on the basis of the measured samples of the communication packets, a normal distribution is estimated at PPLs of a controller with use of its measured statistical data, and it is judged whether the packet communication of a call requiring the registration to the corresponding trunk line is permitted or prohibited.

That is, in accordance with the present invention, the transmission band required by a terminal is considered not to be specified in the calling massage from the terminal but to be estimated on the basis of measured samples on the past communication. As a result, a more practical data can be obtained as index data of new-call registration permission or inhibition so that the transmission band of the trunk line of the call suitable for the actual communication packet amount can be selected, whereby the trunk line transmission band can be highly efficiently used.

Since there is provided a detection means in the memory for detecting such a situation that the number of discard packets per trunk line is remarkably large, when such situation is detected, the request packet rate of the terminal corresponding to the registered call is returned to its initial packet rate, whereby communication of a less number of discard packets can be ensured.

BRIEF DESCRIPTION OF THE DRAWINGS

FIG. 10 shows an example of memory data of a medium pattern control table (MPCT) in the controller of the exchange of the present embodiment;

FIGS. 11 to 13 show examples of memory data of estimation coefficient application tables in the controller of the exchange of the present embodiment;

FIG. 14 shows an example of memory data of a medium/reference packet rate table (MUT) in the controller of the exchange of the present embodiment;

FIGS. 15(a)–(c) show an example of learning procedure in the MPCT based on a transmission band learning system in the present embodiment;

FIG. 21 shows an example of contents of the data (TBTi);

FIG. 23 shows an example of memory data of a trunk-j registration call table in the controller of the exchange;

FIG. 30 shows an example of data contents of a reference normal distribution table stored in N 0.1 table in the present embodiment;

DESCRIPTION OF THE PREFERRED EMBODIMENTS

Figure 1:
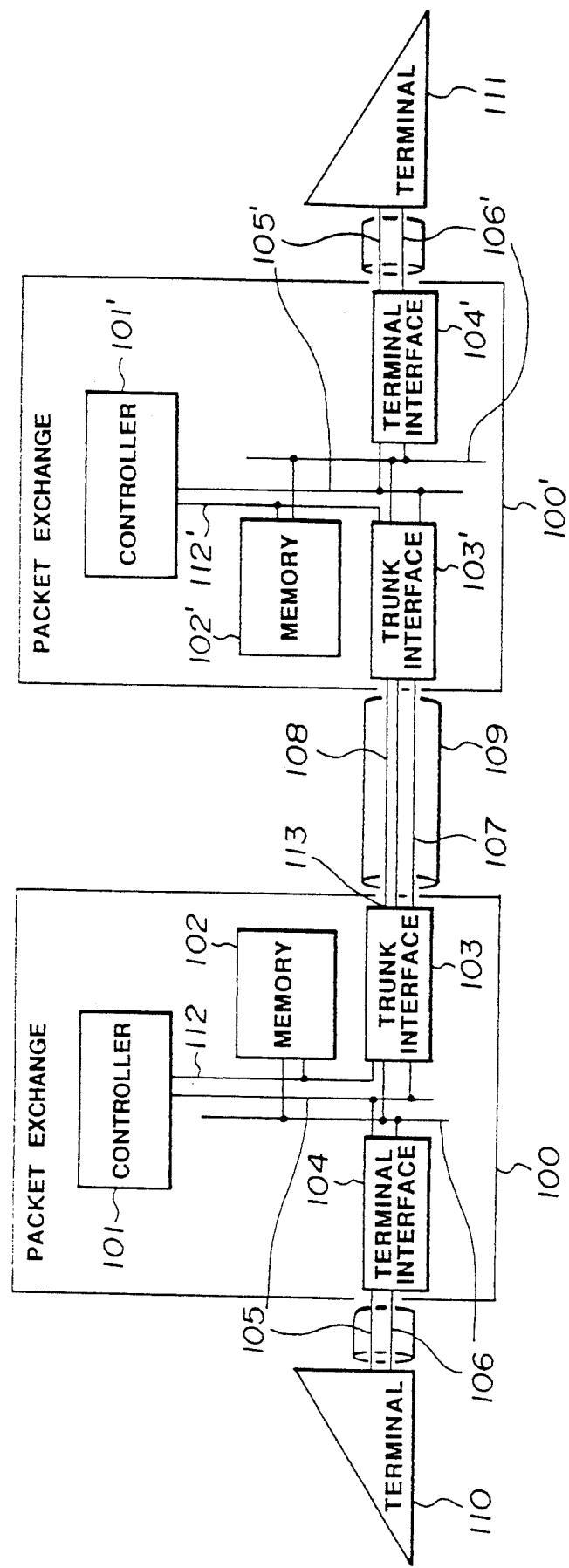
FIG. 1 is a functional block diagram showing a general arrangement of a packet exchange system.
Figure 2:
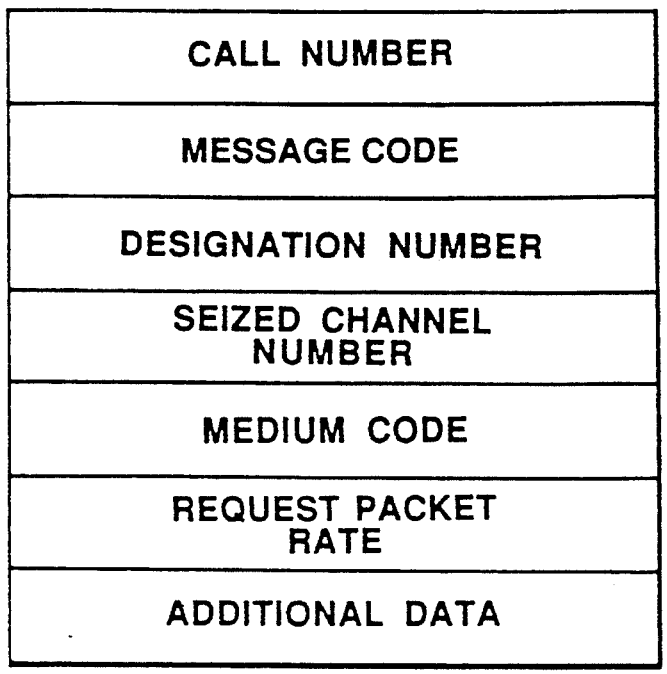
FIG. 2 is a diagram showing an exemplary format of a call message used in call control of this sort of packet exchange system.
Figure 3:
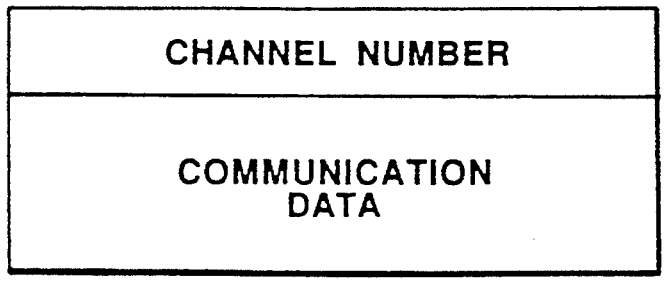
FIG. 3 is a diagram showing an exemplary format of a communication packet to be transmitted based on the call control.
Figure 4:
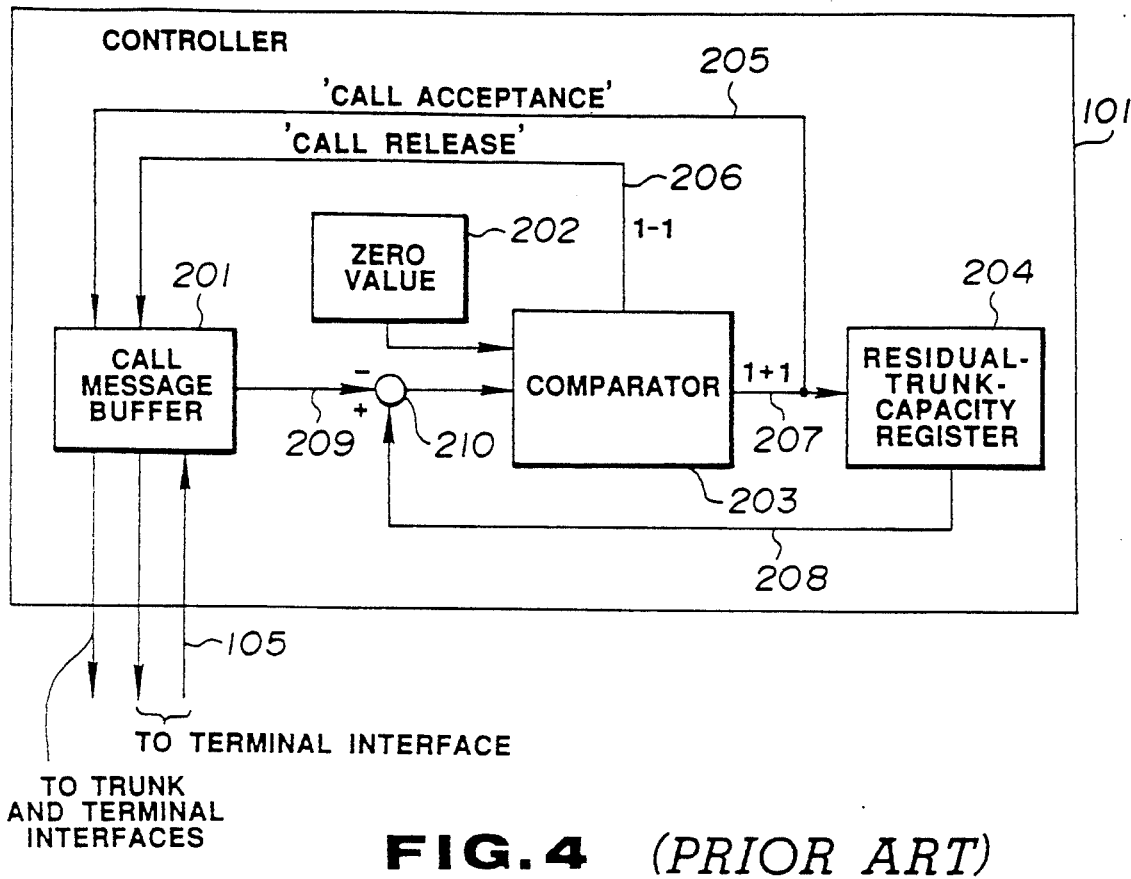
FIG. 4 is a functional block diagram showing an arrangement of a controller in a prior art exchange.
Figure 5:
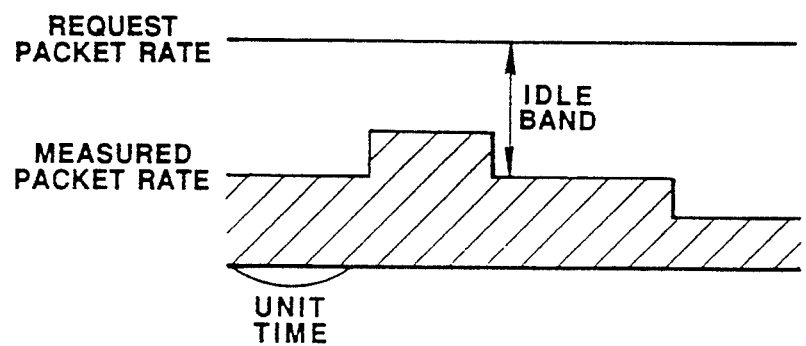
FIG. 5 shows a transmission characteristic based on a prior art band management system.

Embodiments of the present invention will be described in detail with reference to the accompanying drawings. Even in the explanation of the embodiments of the present invention, the basic arrangement of the packet exchanges of FIG. 1, the call message of FIG. 2 and the format of the communication packet of FIG. 3 are used as they are.

A first embodiment of the present invention is featured in that a trunk interface learns a new medium pattern registerable for a trunk line from the number of communication packets per unit time measured for each medium pattern corresponding to a media combination to use the learned data in judging permission or nonpermission of registration of a new call.

Figure 6:
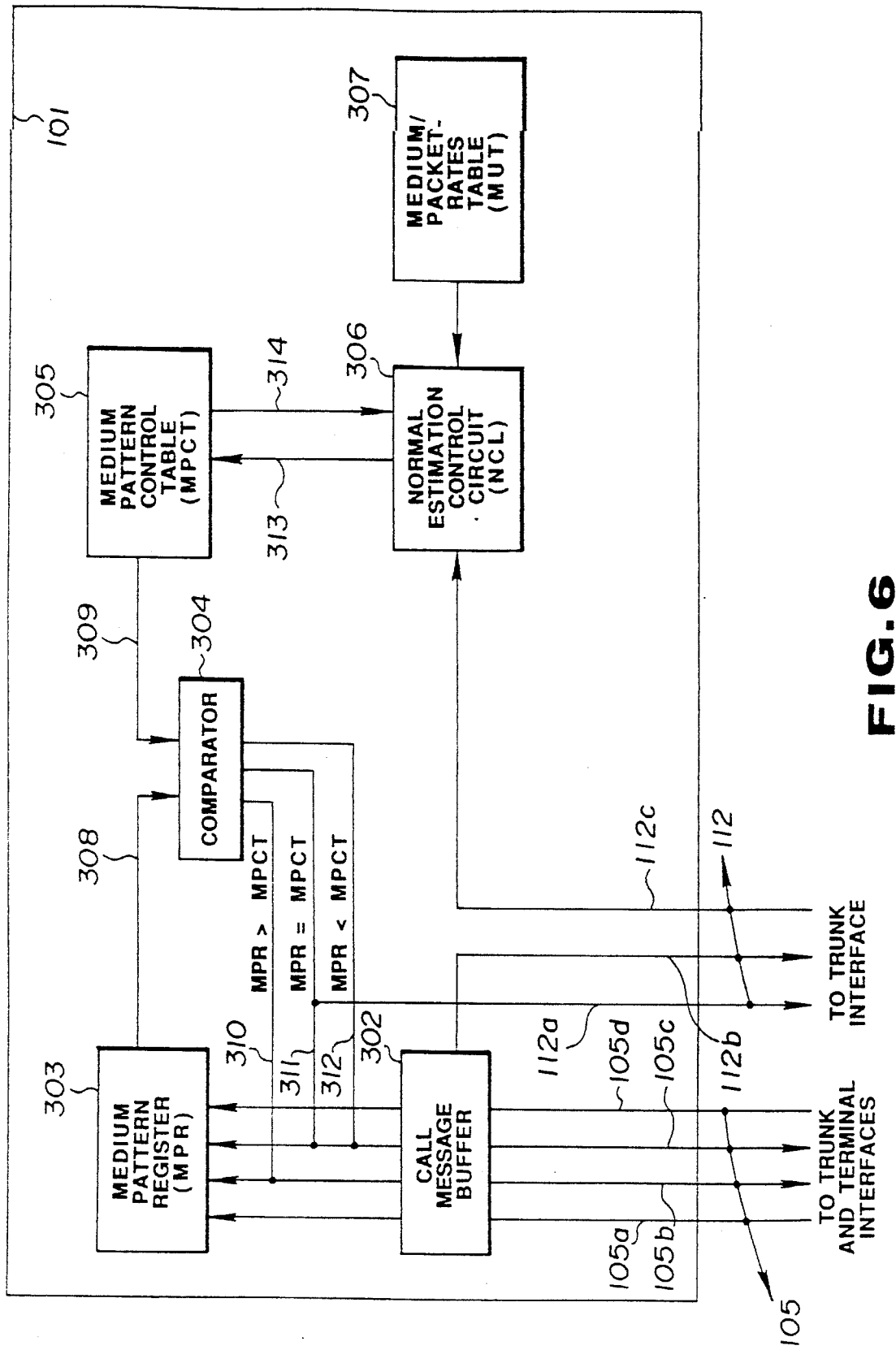
FIG. 6 is a functional block diagram showing an embodiment of a controller in an exchange in accordance with the present invention.

The first embodiment of the present invention having such a feature will be explained by referring to FIGS. 6 to 17. Referring first to FIG. 6, there is shown a functional arrangement of the controller 101 of a packet exchange in the present embodiment, which corresponds to the controller 101 in the system of FIG. 1.

In FIG. 6, when a 'call setting' message is applied from a terminal through a terminal interface associated with the terminal to the controller 101, the 'call setting' message is sent to a medium pattern register (MPR) 303 through the call signal line 105, a signal line 105a and a call message buffer 302.

Figure 7:
FIG. 7 is a diagram showing exemplary memory data in a medium pattern register (MPR) in the controller of the exchange of the present embodiment.

The medium pattern register 303 is used to store therein the numbers of calls in different media currently being registered as shown in FIG. 7. The respective initial values of the respective media stored in the medium pattern register 303 are all zero and each time a call corresponding to each medium is registered, the associated initial value is added by 1.

It is now assumed that a call is not input until registration judgment for a series of calls is completed. The values stored in the medium pattern register 303 are sent to a comparator 304 to be compared with an output of a medium pattern control table (MPCT) 305 storing therein a limit medium pattern obtained through a learning system (which will be explained later) for call registration judgment based on its comparison results.

When the call registration judgment is made that the respective medium traffics stored in the medium pattern register 303 are smaller than the medium traffics of the limit media pattern stored in the medium pattern control table 305 (MPR<MPCT), the comparator 304 informs the trunk and terminal interfaces of a 'call acceptance' message via a signal line 312, the call message buffer 302, a signal line 105c and the call signal line 105 to accept the registration of a new call.

When the call registration judgment is made that the respective medium traffics stored in the medium pattern register 303 are larger than the medium traffics of all the limit media patterns stored in the medium pattern control table 305 (MPR>MPCT), the comparator 304 informs the terminal interface of a 'call release' message via a signal line 310, the call message buffer 302, a signal line 105b and the call signal line 105 and at the same time, subtracts 1 from ones of the traffics of the respective media stored in the medium pattern register 303 and corresponding to the released call to reject the call.

If the traffics of the respective media stored in the medium pattern register 303 coincide with the traffics of the respective media of the limit medium pattern stored in the medium pattern control table 305 (MPR=MPCT), then the comparator 304 informs the trunk and terminal interfaces of a 'call acceptance' message via a signal line 311, the call message buffer 302, a signal line 105c and the call signal line 105 and also informs the trunk interface of a measurement command via a signal line 112a and an internal control bus 112 to accept a new call and start measuring the number of packets per unit time.

In the case where the traffics of the respective media stored in the medium pattern register 303 coincide with the traffics of the respective media of the limit medium pattern stored in the medium pattern control table 305, the call message buffer 302, when receiving a 'call release' message, informs the trunk interface of a measurement end command via a signal line 112b and the internal control bus 112.

Figure 8:
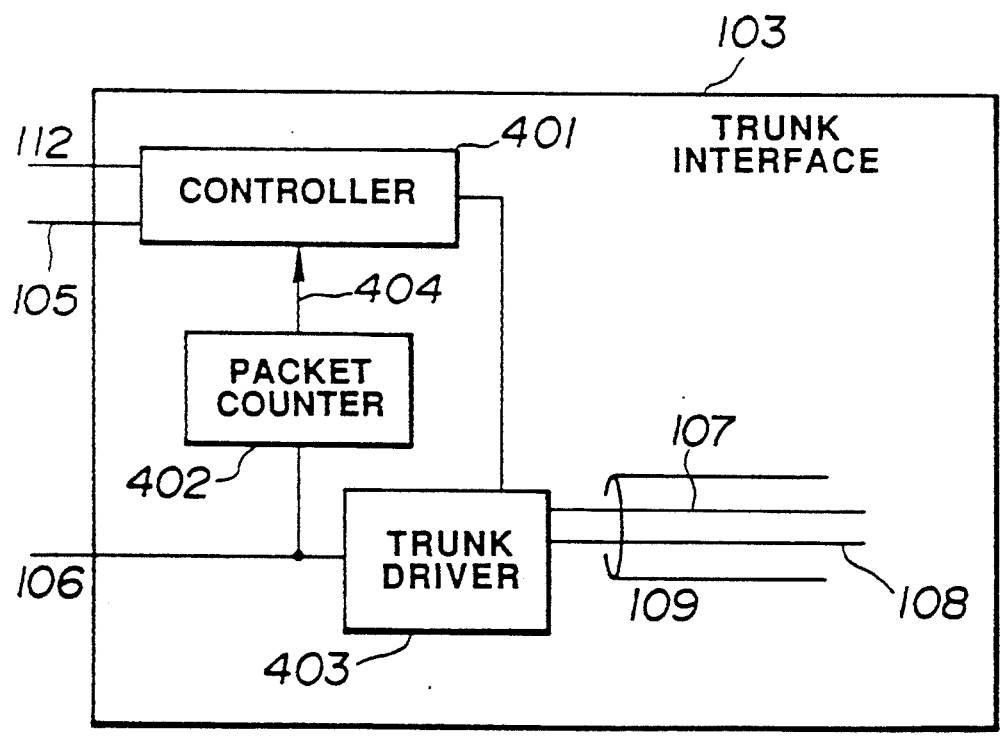
FIG. 8 is a functional block diagram showing an embodiment of a trunk interface in accordance with the present embodiment.

FIG. 8 shows an arrangement of the trunk interface in the present embodiment. More precisely, FIG. 8 shows only the packet counting function among the functions of the trunk interface.

The trunk interface 103, during a period from the reception of the measurement command through the call signal line 105 from the controller 101 to the reception of the measurement end command, monitors communication packets on the internal data line 106 of the packet exchange applied to a trunk driver 403 and the packer counter 402 incrementally counts the number of such communication packets.

The count value of the packet counter 402 is sent, as a unit time measured value 404, to and collected at a controller 401 of the trunk interface at intervals of a unit time. The controller 401, when informed of the measurement end command from the controller 101, informs a normal estimation control circuit (NCL) 306 provided in the controller 101 of measurement data corresponding to the structure elements of the medium pattern control table 305 (which will be detailed later), that is, of a measurement unit time number (occurrence frequency), a sum of unit time packet numbers (packet rate sum) and a sum of squared unit time packet numbers (squared packet rate sum), via the internal control bus 112 and a signal line 112c.

Figure 9:
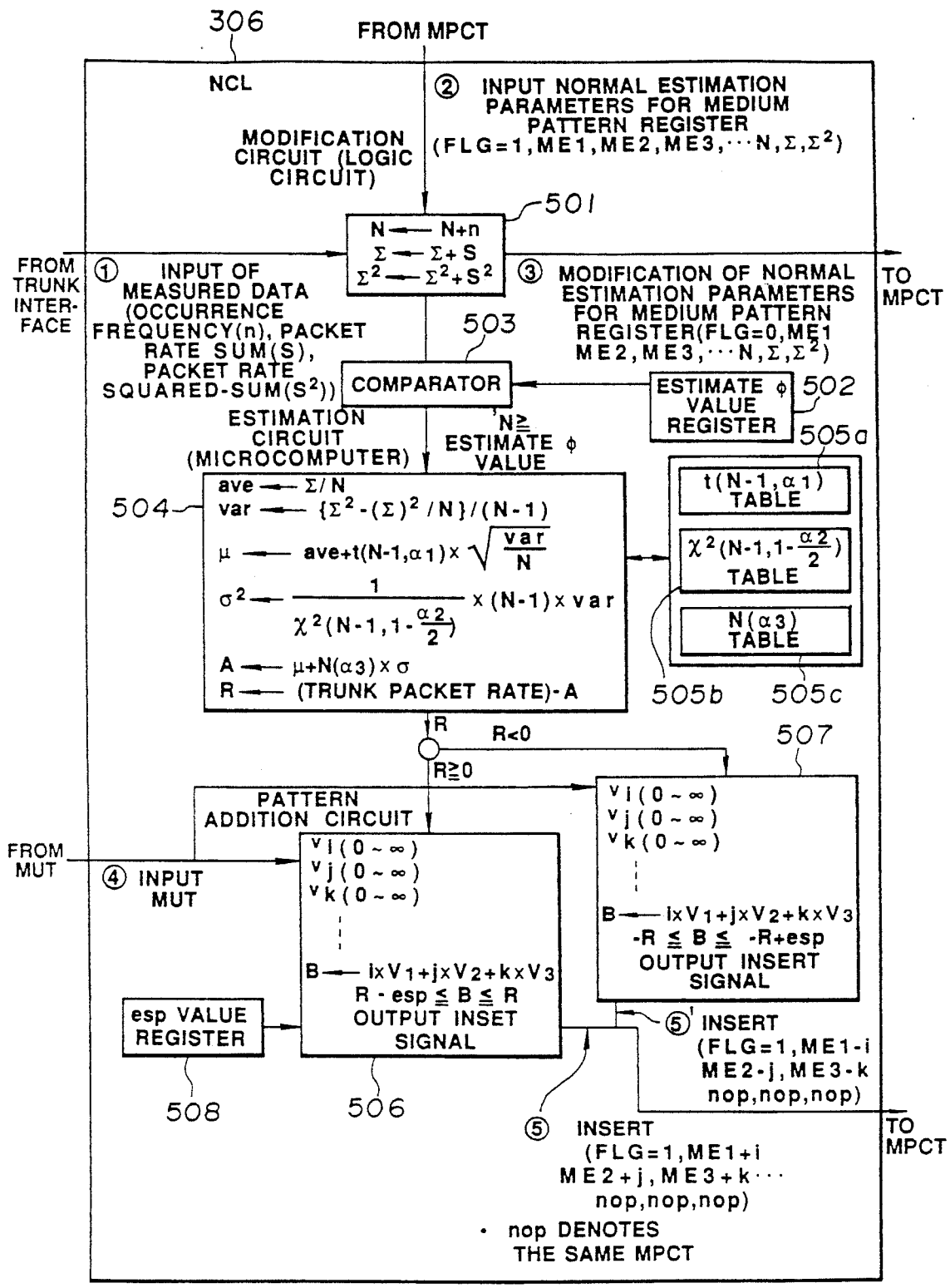
FIG. 9 is a functional block diagram of a normal estimation control circuit (NCL) in the controller of the exchange in accordance with the present embodiment.

FIG. 9 is a flowchart for explaining the internal control operation of the normal estimation control circuit 306. More specifically, measurement data measured at the trunk interface 103 during existing period of one medium pattern is applied to the normal estimation control circuit 306 which in turn executes its necessary control operation on the basis of the applied measurement data. For this control operation, the normal estimation control circuit 306 is required to receive a normal estimation parameter 314 from the medium pattern control table 305.

The structure of the medium pattern control table 305 will be explained by referring first to FIG. 10. In the drawing, the medium pattern control table 305 comprises a limit flag (FLG) indicative of a limit medium pattern obtained as a result of learning a medium pattern (which will be explained later), medium patterns (medium 1 traffic (ME1), medium 2 traffic (ME2), medium 3 traffic (ME3), . . . ) obtained through the learning operation of the initial registration medium patterns to be described later, a total pattern occurrence frequency (N) for estimating measured packet numbers per unit time for each medium pattern based on normal distribution, a total packet rate sum ($\Sigma$) corresponding to a sum of accumulated measured packet numbers per unit time, and a total packet rate squared-sum ($\Sigma^2$) corresponding to a sum of squared measured packet numbers per unit time. Stored in the table 305 are all the limit medium patterns when the maximum packet rates are assumed as their initial values for the respective media.

Turning back to FIG. 9, explanation will be made as to the internal control operation of the normal estimation control circuit 306.

When a modification circuit 501 of the normal estimation control circuit 306 receives measured data values (1) (occurrence frequency=n, packet rate sum=s, packet rate squared-sum=$s^2$) from the trunk interface and also received limit medium pattern parameters (2) (FLG=1, ME1, ME2, ME3, . . . , N, $\Sigma$, $\Sigma^2$) from the medium pattern control table 305, the modification circuit 501 executes the following calculations to find measured data for each total medium pattern and sends the measured data to the medium pattern control table 305 as a pattern addition/modification 313 to modify the limit medium pattern parameters so far stored in the medium pattern control table 305 to new parameters (3)(FLG=0, ME1 ,ME2, ME3, . . . , new N value, new $\Sigma$ value, new $\rho^2$ value).

$$N \leftarrow N+n$$

$$\Sigma \leftarrow \Sigma + s$$

$$\Sigma^2 \leftarrow \Sigma^2 + s^2$$

And when a comparator 503 compares the new N value with a preset value previously set in an estimate $\phi$ register 502 and determines that the new N value is equal to or larger than the estimate $\phi$, the comparator issues an operation request to an estimation circuit 504 to start estimating operation therein.

The estimation of normal distribution is carried out by performing the following calculations with use of a sample average (ave) and an unbiased variance (var).

$$Xave = \Sigma/N$$

$$var \leftarrow 1/(N-1) \cdot \sum_{i=1}^{N}(Xi - Xave)^2;$$

$$\mu \leftarrow ave + t(N-1, \alpha_1)(var/N)^{\frac{1}{2}}$$

$$\sigma^2 \leftarrow 1/(\chi^2(N-1, 1-\alpha_2/2)) \times (N-1) \times var$$

$$A \leftarrow \mu + N(\alpha_3) \times \sigma$$

$$R \leftarrow (\text{trunk packet rate}) - A$$

In the above calculations, a table 505a for storing therein the value $t(N-1, \alpha 1)$ corresponding to the sample number N, a table 505b for storing therein the value $\chi^2(N-1)$, $1-\alpha 2/2$), and a table 505c for storing therein the value $N(\alpha 3)$ are used as estimation coefficients for estimation of the value A.

Examples of data to be stored in these tables 505a, 505b and 505c are shown in FIGS. 11 to 13 respectively. In estimation of the value A, preset significance levels $\alpha 1$, $\alpha 2$ and $\alpha 3$, the values $t(N-1, \alpha 1)$, $\chi^2(N-1, 1-\alpha 2/2)$ and $N(\alpha 3)$ corresponding to the sample number N are sent from the tables 505a, 505b and 505c respectively to the estimation circuit 504.

The estimation circuit 504, when estimating the value A, further calculates a residual trunk capacity (R) with use of the estimated value A to cause respectively independent pattern addition circuits 506 and 507 to start their operation according to the positive or negative of the calculated residual trunk capacity value R.

More specifically, if $R \geq 0$ then the pattern addition circuit 506 is operated to add or insert all medium patterns which do not allow further additional media insertion any longer in the residual trunk capacity R (in other words, close to the trunk rate) into the medium pattern control table 305 as new limit medium patterns in the form of an INSERT signal (5) (FLG=1, ME1+i, ME2+j, ME3+k, . . . , nop, nop, nop, where 'nop' represents the same value as that stored in the medium pattern control table 305).

Although i, j, k, . . . are retrieved from 0 to 00 to find all the medium patterns in FIG. 9, in practical cases, a suitable value is allocated $\infty$. In this case, for judgment of permission or non-permission of addition to the residual trunk capacity R, reference packet rate values for the respective media are previously registered in a media/reference-packet-rates table (MUT) 307 shown in FIG. 6. That is, reference packet rate values v1, v2, v3, . . . are applied to the pattern addition circuit 506. An example of contents of the media/reference-packet-rates table (MUT) 307 is shown in FIG. 14.

If $R<0$ then the pattern addition circuit 507 is operated. In this case, since the packet rates of the previous limit medium patterns have been too large, negative feedback operation is applied as illustrated so that all medium patterns close to their trunk rates are added to the medium pattern control table 305 as an INSERT signal (5') (FLG=1, ME1-i, ME2-j, ME3-k, . . . , nop, nop nop, where 'nop' represents the same value as that stored in the medium pattern control table 305).

The additional operation to the medium pattern control table 305 is realized, in the case of a new combination of medium patterns, by adding the data of the INSERT signal into the medium pattern control table 305 and when the medium patterns already exist in the medium pattern control table 305, by rewriting the FLG in the corresponding medium patterns to "1".

The value close to the trunk rate, i.e., the 'esp' in the drawing is previously set in an 'esp'-value register 508.

Shown in FIG. 15 is part of an example of limit medium pattern learning actually carried out based on this transmission band learning system. In the drawing, symbol ME1 corresponds to a telephone terminal medium (maximum packet rate = 125 packets/sec.), ME2 corresponds to a data terminal medium (maximum packet rate = 125 packets/sec.), and ME3 corresponds to a television conference terminal medium (maximum packet rate = 750 packets/sec.). Further, the trunk packet rate is 3000 packets/sec. The initial values of the medium pattern control table 305 are given as mentioned above in forms of all the limit medium patterns based on the maximum packet rates of the respective media, and in the illustrated example, the table 305 comprises 65 of the limit medium patterns one of which has an ME1 of 10, an ME2 of 8 and ME3 of 1 (refer to FIG. 15(a)).

Thereafter, when the system is operated and a specific limit medium pattern occurs 10 or more times (estimate $\phi$ value = 10), estimation is carried out under the condition that esp=250, $\alpha1=\alpha2=\alpha3=0.01$ by the timing of FIG. 15(b), whereby such limit medium pattern learning as shown in FIG. 15(c) is realized.

Figure 16:
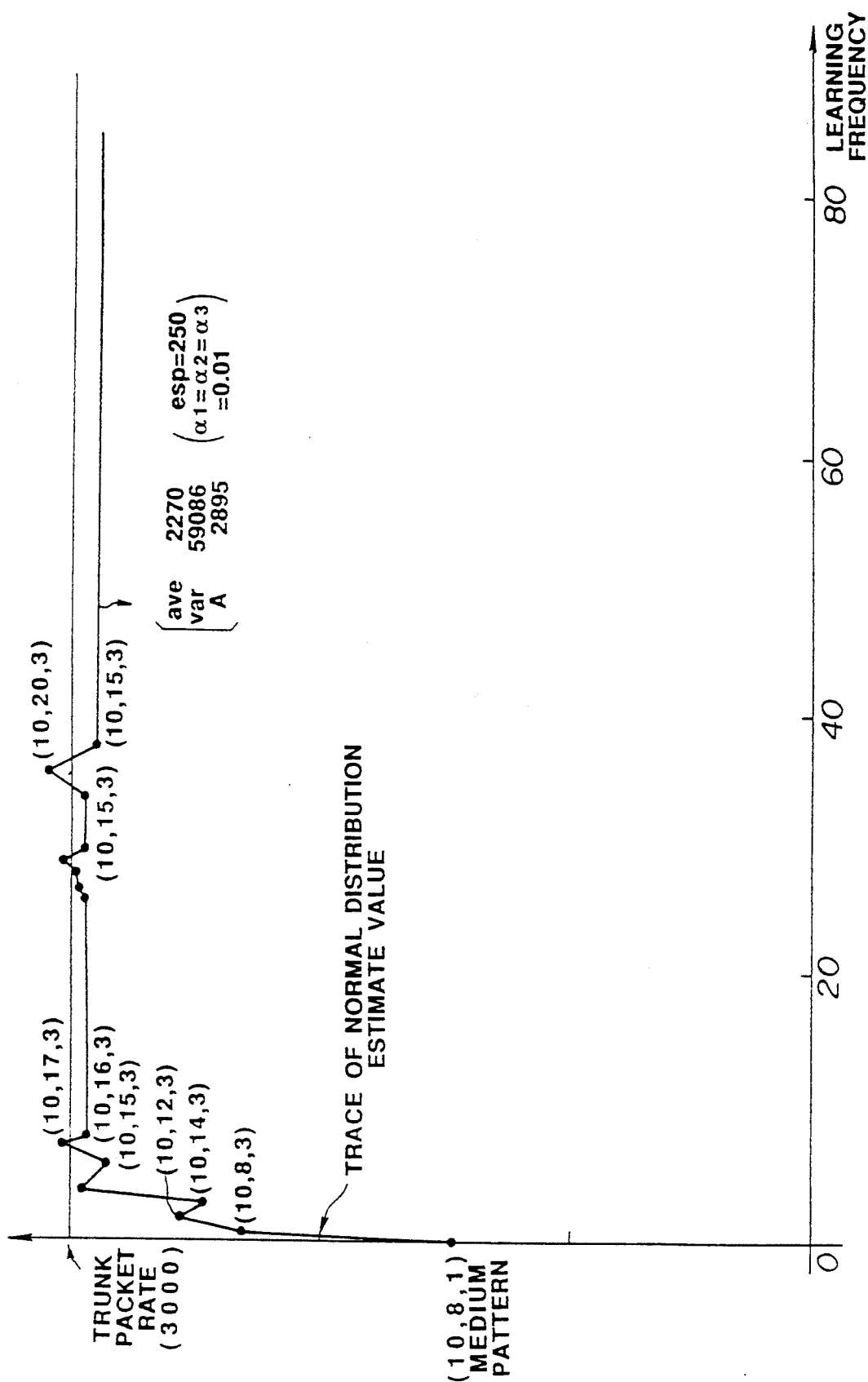
FIG. 16 is a graph showing a locus of learning procedure of a medium pattern based on the transmission band learning system of the present embodiment.

FIG. 16 shows a convergence in one learning process with respect to the learning frequency (estimation frequency) carried out in the same example as in FIG. 15. It will be seen from FIG. 16 that the effective trunk use system can be realized by means of the learned limit medium pattern and at the same time the stable convergence can be obtained. In the present embodiment, there is a possibility that the packet rate of the learned limit medium pattern exceeds the trunk packet rate, but the discard of the exceeded packets in this case can be prevented by storing the exceeded packets in a memory (for example, memory 102 in the system of FIG. 1) provided in the packet exchange.

Figure 17:
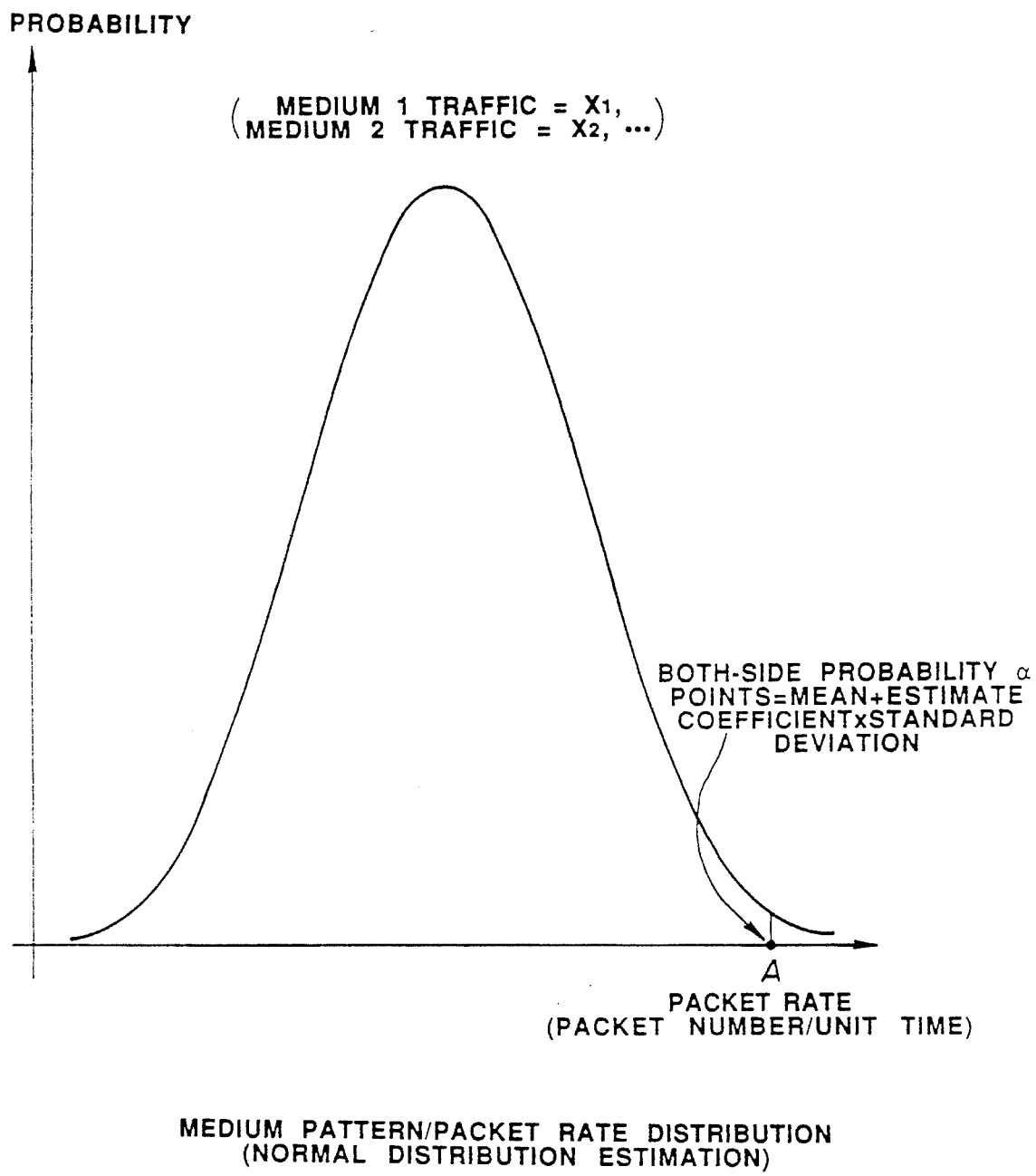
FIG. 17 shows a medium pattern/packet rate distribution in the present embodiment.

The present embodiment utilizes the fact that the packet rate distribution based on infinite sampling operations for each medium pattern becomes substantially a normal distribution as shown in FIG. 17. The control explained in connection with the present embodiment may be similarly realized not only by means of the controller mounted in the packet exchange but also by means of an external control computer externally connected to the packet exchange.

As has been described in the foregoing, in accordance with the present embodiment, the management of the trunk transmission band is sequentially learned by means of the limit medium pattern so that the actually measured value of the communication packet number of the medium pattern actually occurred in the past is used in the registration judgment of a new call, whereby the request packet rate can correspond to the actual packet communication amount and thus the efficient use of the trunk transmission band can be realized.

In the present embodiment, further, in finding a combination medium pattern of the maximum terminal traffic addible to the residual trunk capacity band, if the combination pattern, as the residual trunk capacity band, is between the normal distribution estimate value of samples for each medium pattern and a region slightly smaller than the estimate value, then the combination medium pattern is regarded as a limit medium pattern. As a result, the learning divergence caused by statistical processing of measured samples can be prevented and therefore stable convergence can be realized. Further, according to the present embodiment, since the sample number larger than the specified value is assigned, stable estimation can be realized. By virtue of the synergistic action of the aforementioned effects, the present embodiment can be highly effectively applied to such a packet exchange that requires various sorts of media to be efficiently connected thereto.

Explanation will next be made as to a second embodiment of the present invention. Even in the explanation of the second embodiment, the basic arrangement of the packet exchanges of FIG. 1, the call message of FIG. 2 and the format of the communication packet of FIG. 3 are employed without any modifications as they are. The second embodiment is featured in that the multiplex packet rate of a trunk line multiplexed for every call is estimated on the basis of samples of the packet rates measured at the terminal interface and the estimated value is used for judgment of permission or nonpermission of registration of a new call.

The second embodiment having such a feature will be explained by referring to FIGS. 18 to 32.

Figure 18:
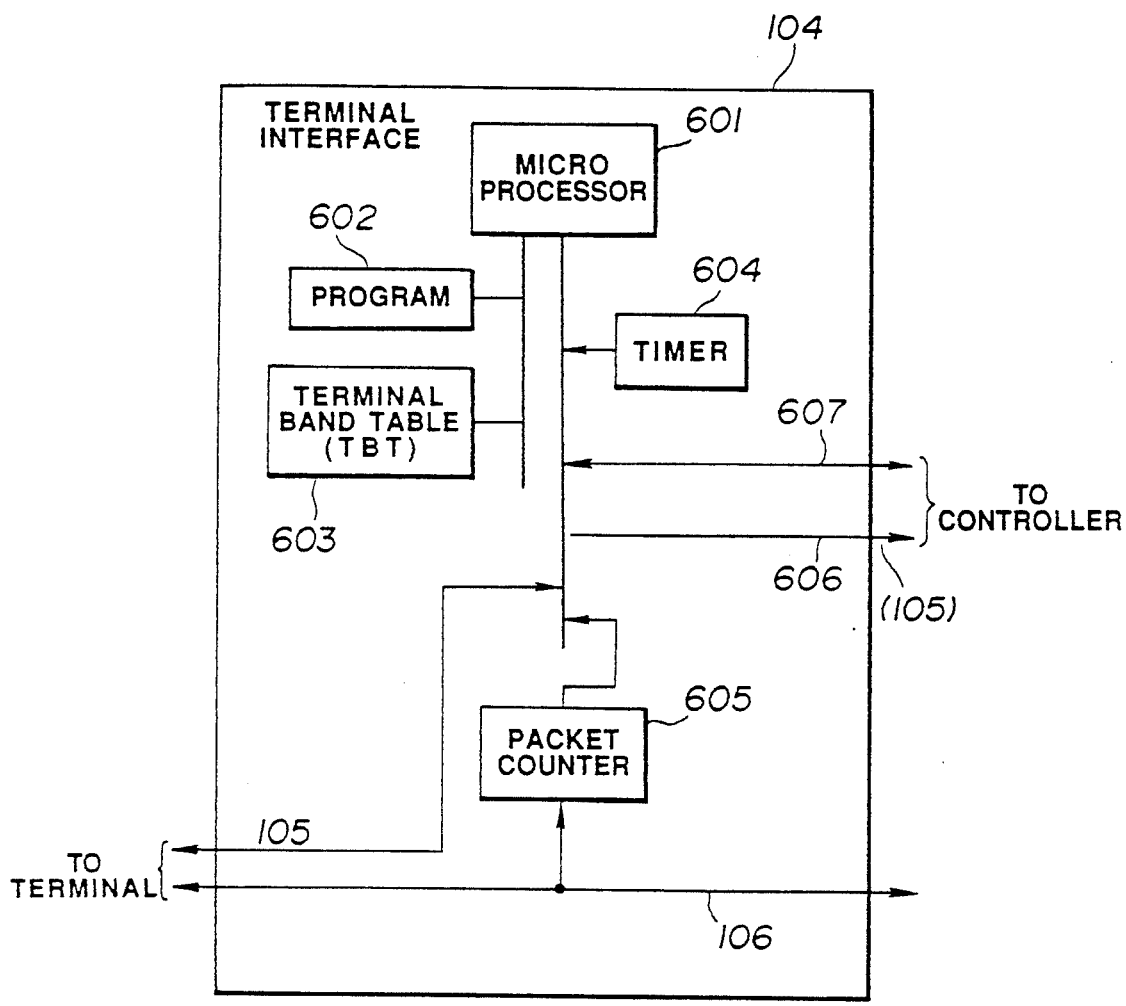
FIG. 18 is a functional block diagram showing a terminal interface in accordance with another embodiment of the present invention.

FIGS. 18 to 21 are for explaining the terminal interface used in the present embodiment. More specifically, FIG. 18 shows a functional block diagram of the terminal interface 104. The terminal interface 104 comprises a circuit for measuring packet rate samples for each terminal and calculating its mean value and variance value and a circuit for adding these calculated values to the call message and informing the controller of the added call message. In FIG. 18, when a terminal receives a call and is in communication with the party, the number of packets transferred through the data line 106 therebetween is measured by a packet counter 605.

Figure 19:
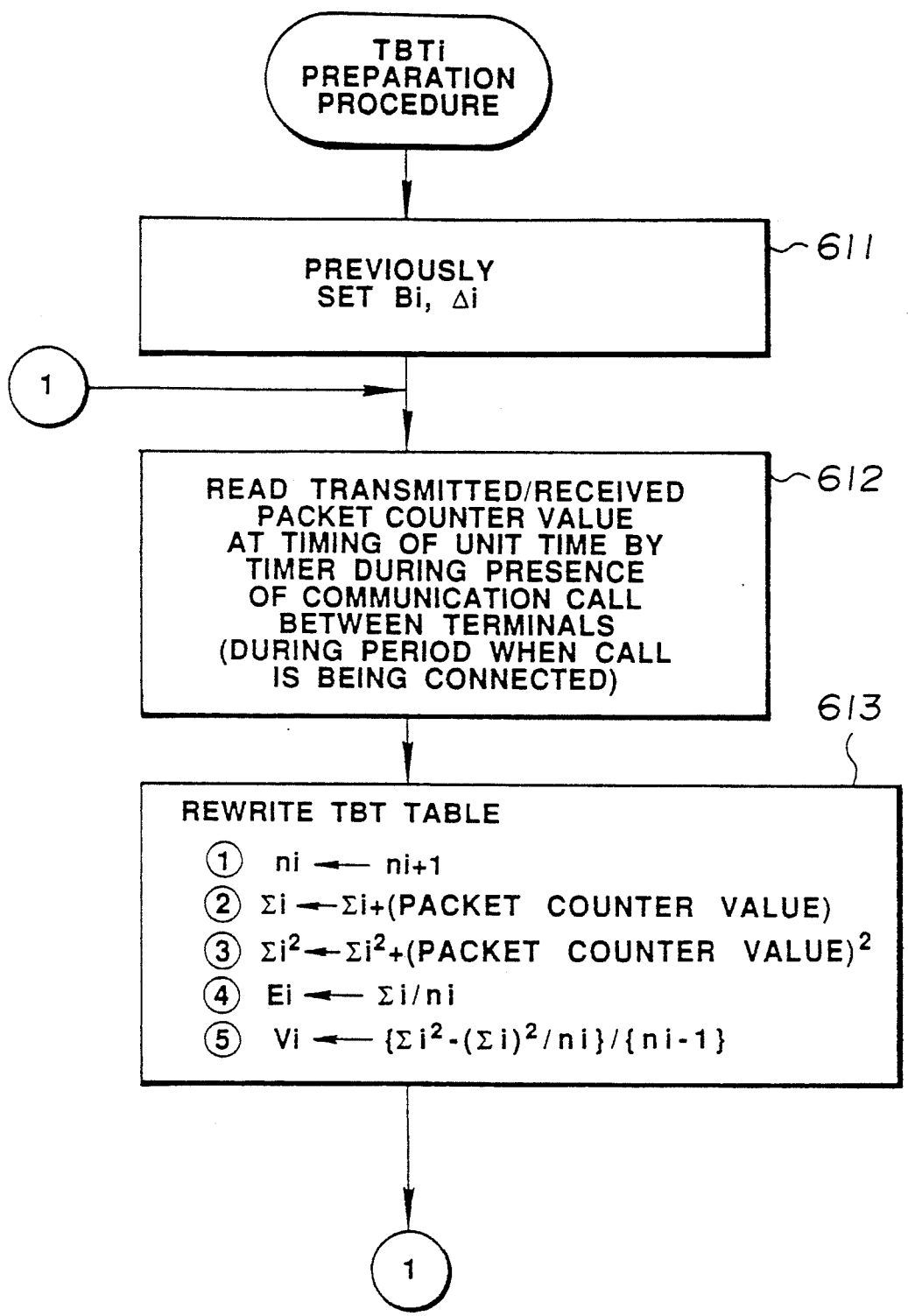
FIG. 19 is a flowchart showing a procedure of generating storage data (TBTI) for a terminal band table (TBT) in the present embodiment.

Shown in FIG. 19 is a procedure according to which a mean value and a variance value for the packet number are prepared on the basis of the count value of the packet counter 605.., In more detail, in this procedure, a microprocessor 601 of the terminal interface 104 prepares a terminal band table (TBT) 603 while executing a program 602. An example of contents of the terminal band table 603 prepared according to this procedure is shown in FIG. 21.

Turning back to FIG. 19, explanation will be made as to the preparation procedure of the terminal band table 603. In carrying out this procedure, an initial packet rate (Bi) value indicative of the transmission band of a call generated from the associated terminal when the measuring frequency of the packet rate is less as well as a statistical-processing start threshold ($\Delta i$) for judgment of whether or not the statistical processing is possible due to the less measuring frequency are previously set, as initial data, in the terminal band table 603 by means of manual setting operation or the like (step 611).

And when a call is set in communication between terminals and packet communication is actually started, the microprocessor 601 reads the count value of the packet counter 605 at intervals of a constant time set by a timer 604 and holds therein the read count value as one packet rate sample (step 612). The microprocessor 601 further performs calculations in accordance with illustrated computation equations as the number of samples increases and rewrites the data contents of the terminal band table 603 to the corresponding calculated values (step 613).

As a result of the measurement of the packet rate based on the calculation processing, a mean value and a variance value (in the illustrated example, arithmetic average value and an unbiased variance) of the terminal band packet rates are set in the terminal band tables 603 of the respective terminals.

Figure 20:
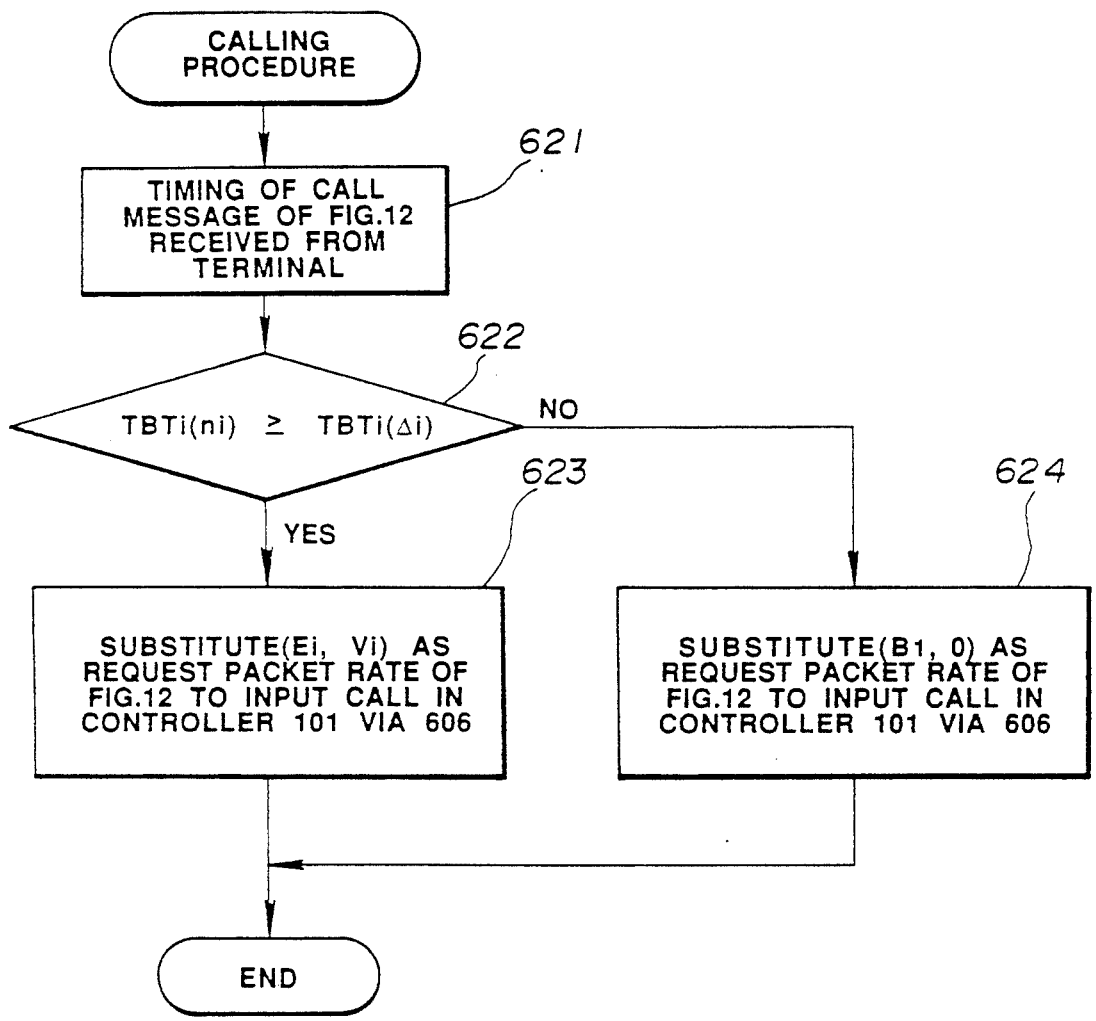
FIG. 20 is a flowchart showing a calling procedure based on the data (TBTi)

Thereafter, when the terminal interface 104 receives a call message from a terminal, it carries out such calling procedure as shown in FIG. 20.

In more detail, when the terminal interface 104 receives the aforementioned call message (step 621), the microprocessor 601 judges whether or not the measuring frequency (ni) of the terminal band table 603 is equal to or larger than the statistical-processing threshold value ($\Delta i$) (step 622). When the measuring frequency (ni) is equal to or larger than the statistical-processing threshold value ($\Delta i$), that is, when the microprocessor 601 judges that the statistical values (mean and variance values) obtained through the measurement are sufficiently reliable with respect to the population of the communication packet rate distribution of the terminal, the microprocessor 601 substitutes the mean value (Ei) and the variance value (Vi) for the request packet rate values of the call message and sends the call to the controller 101 through a call signal line 606 (step 623).

When the measuring frequency (ni) is smaller than the statistical-processing threshold value ($\Delta i$), on the other hand, the microprocessor 601 substitutes the initial packet rate value (Bi) for the maximum packet rate value Ei of the associated terminal and also zero for the variance value Vi to apply the call to the controller 101 via the call signal line 606 (step 624).

Figure 22:
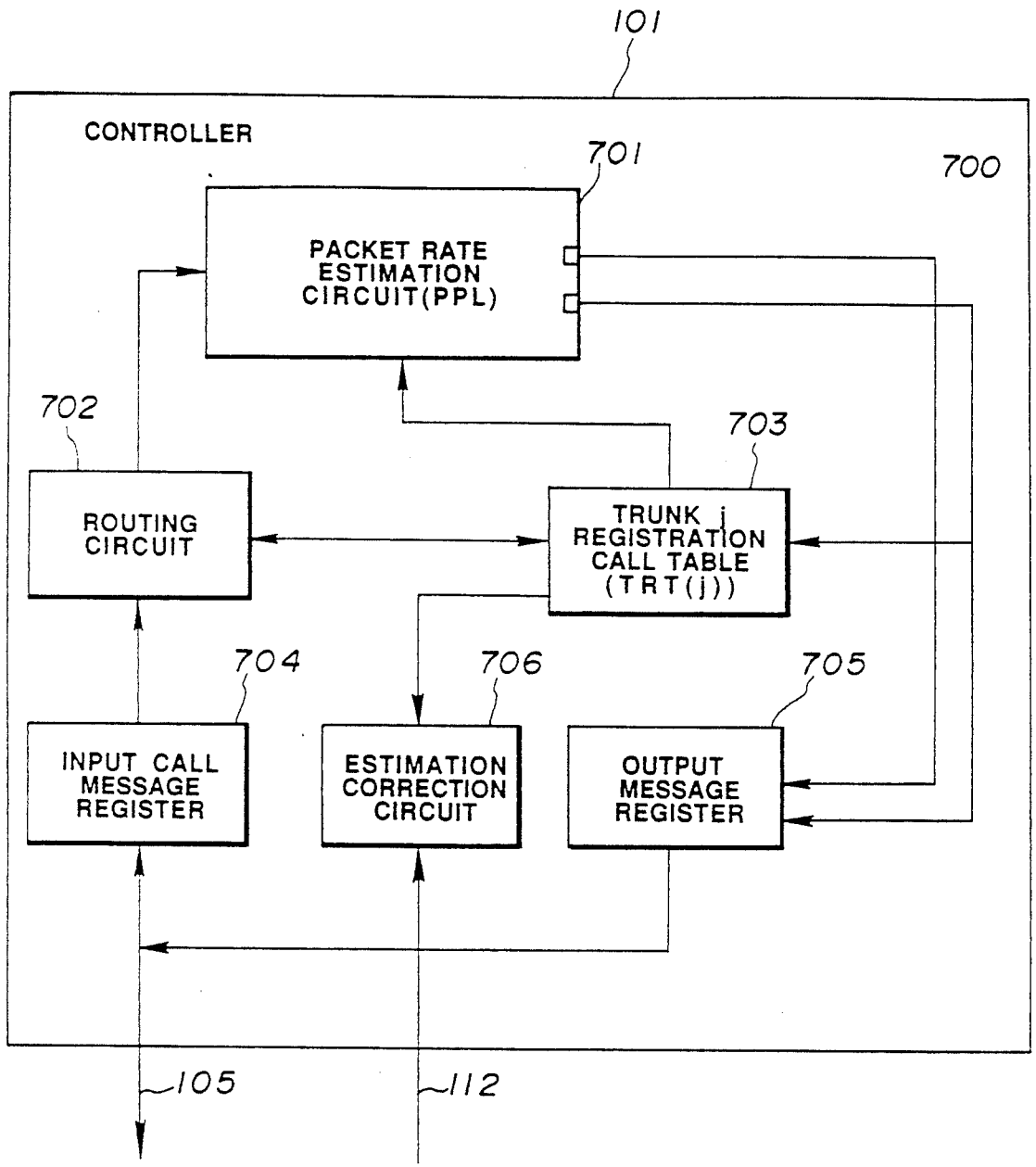
FIG. 22 is a functional block diagram showing an embodiment of the controller in the present embodiment.

FIGS. 22 to 30 are reference diagrams for explaining the functional operation of the controller 101 when receiving the call through the aforementioned processing. Of these drawings, FIG. 22 shows a functional arrangement of the controller 101.

In FIG. 22, the controller 101, when receiving the call via the call signal line 105 from the terminal interface 104 (refer to FIG. 18)(in case of a relay office, from the trunk line), selects one of outgoing trunk lines from a routing circuit 702 through an input-call message register 704 and sends the number value (=j) of the selected trunk line to a trunk-j registration call table (TRT(j)) 703. Previously registered in the trunk-j registration call table 703 are, as shown in FIG. 23, the mean value Ei and variance value Vi of the packet rates informed from the caller terminals already registered for the trunk line. And when the controller 101 receives the aforementioned new call, a packet estimation circuit (PPL) 701 receives all call statistical values (Ei, Vi) of the corresponding trunk line from the trunk-j registration call table 703 and also statistical values (Ei', Vi') of the new call from the routing circuit 702. The functional arrangement of the packet estimation circuit 701 for judging permission or non-permission of registration of the new call with respect to the trunk line based on these input statistical values is shown in FIG. 24.

Figure 24:
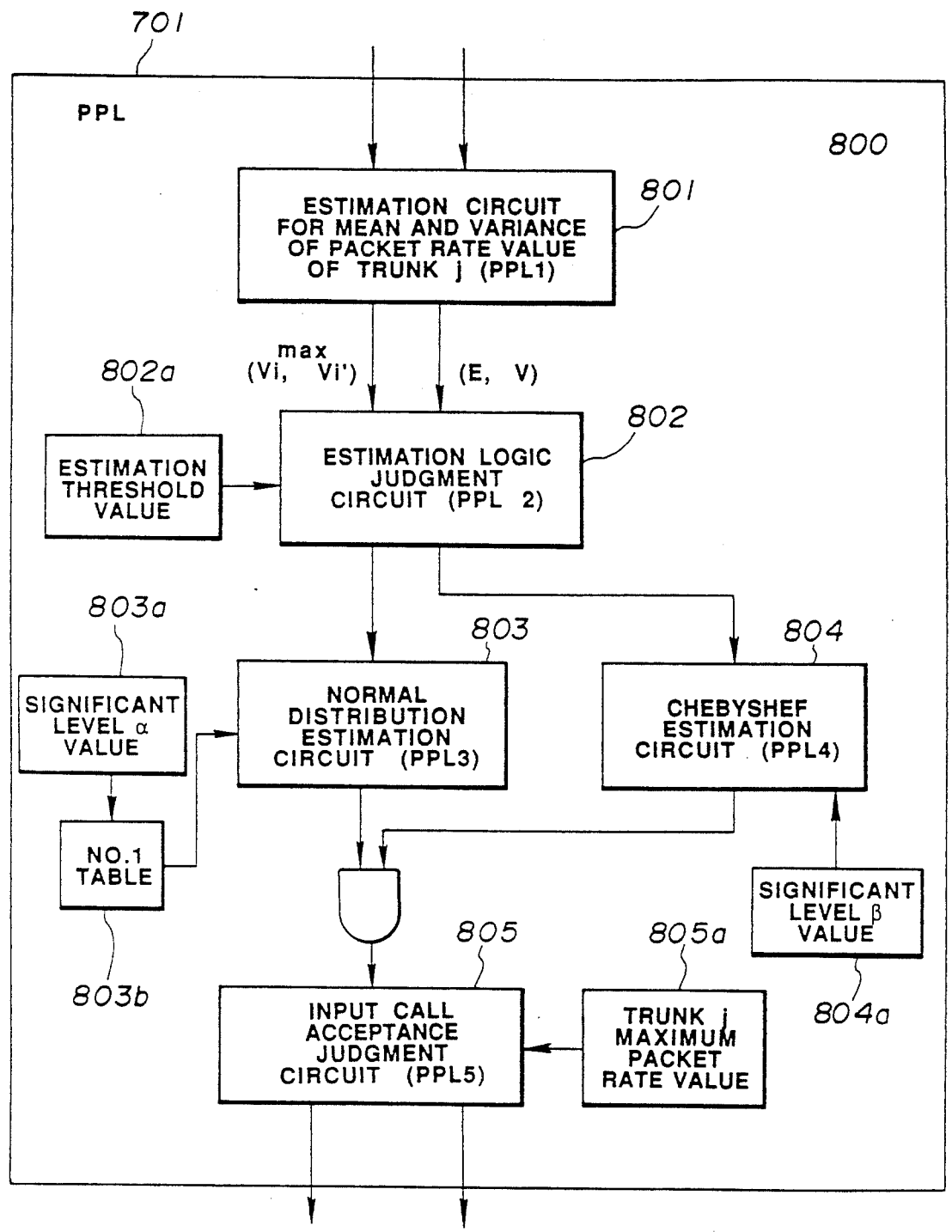
FIG. 24 is a functional block diagram of a packet rate estimation circuit (PPL) in the controller of the exchange.

In the packet estimation circuit 701 of FIG. 24, circuits (PPL1 to PPL5) 801 to 805 have respectively a microprocessor and a memory in which a program is stored. The processing of these circuits based on the program are shown by flowcharts in FIGS. 25 to 29 respectively.

Figure 25:
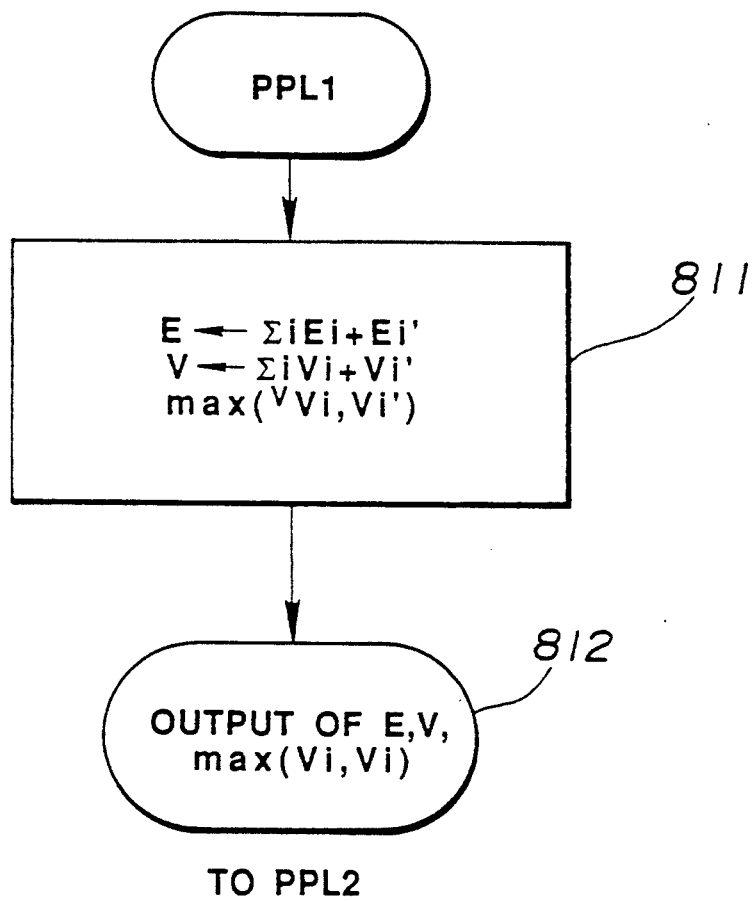
FIGS. 25 to 29 are flowcharts showing estimation processing in the PPL.
Figure 26:
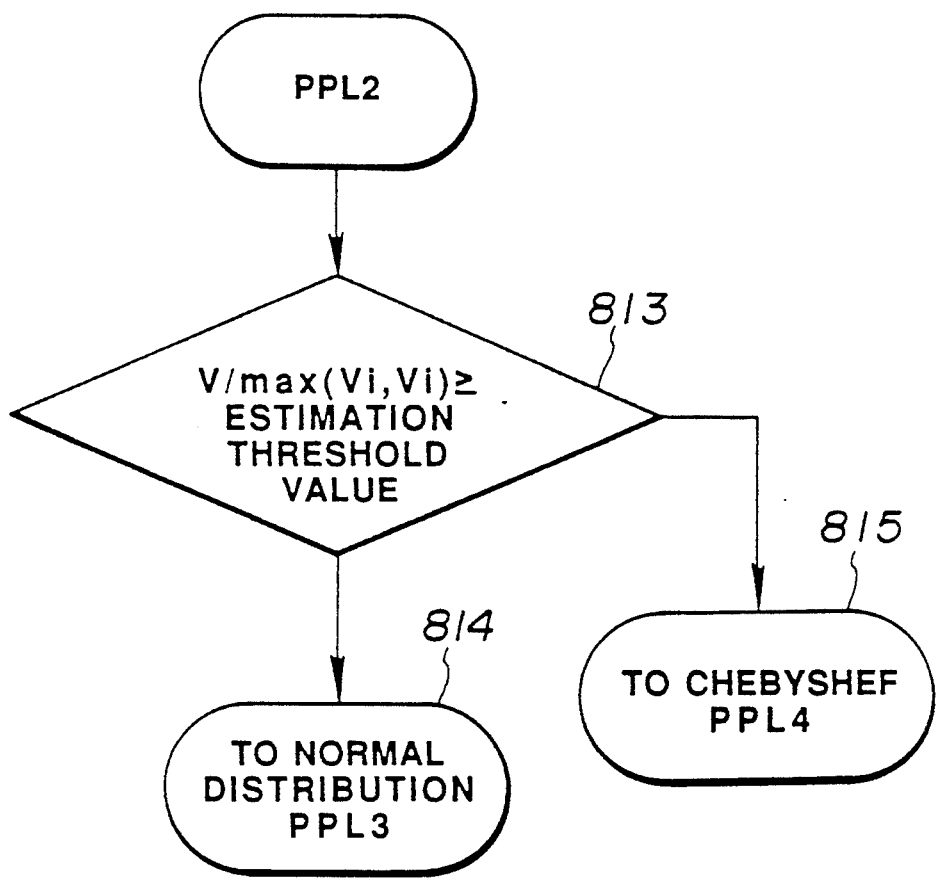

First, the mean/variance estimation circuit (PPL1) 801 in FIG. 24, when receiving all the call statistical values (Ei, Vi) already registered for the corresponding trunk line as well as the statistical values (Ei', Vi') of the received new call, starts such processing procedure as shown in FIG. 25. In this procedure, the mean/variance estimation circuit (PPL1) 801 calculates a mean value (E), a variance value (V) and a maximum variance value max(Vi, Vi') with respect to the multiplex packet rate of the corresponding trunk line (step 811) and sends its calculated results to the estimation-logic judgment circuit (PPL2) 802 (step 812). The estimation-logic judgment circuit (PPL2) 802 in FIG. 24, when receiving the above results from the mean/variance estimation circuit (PPL1) 801, starts such processing procedure as shown in FIG. 26.

In this procedure, the estimation-logic judgment circuit (PPL2) 802 compares a V/max(Vi, Vi') calculated from the output of the mean/variance estimation circuit (PPL1) 801 with a previously-registered estimation threshold value 802a to judge whether or not the multiplexing number input to the trunk line can be processed as normal distribution (step 813). When determining that the V/max(Vi, Vi') is equal to or larger than the estimation threshold value 802a (that is, the number of terminals belonging to the corresponding trunk line is sufficiently large when compared with a reference number of terminals having the maximum variance values to thereby allow approximation to normal distribution), the estimation-logic judgment circuit 802 sends the multiplex mean value (E) and multiplex variance value (V) to the normal-distribution estimation circuit (PPL3) 803 (step 814); whereas, when determining that the V/max(Vi, Vi') is smaller than the estimation threshold value 802a, the estimation-logic judgment circuit 802 sends the values (E) and (V) to the Chebyshef estimation circuit (PPL4) 804 (step 815).

Figure 27:
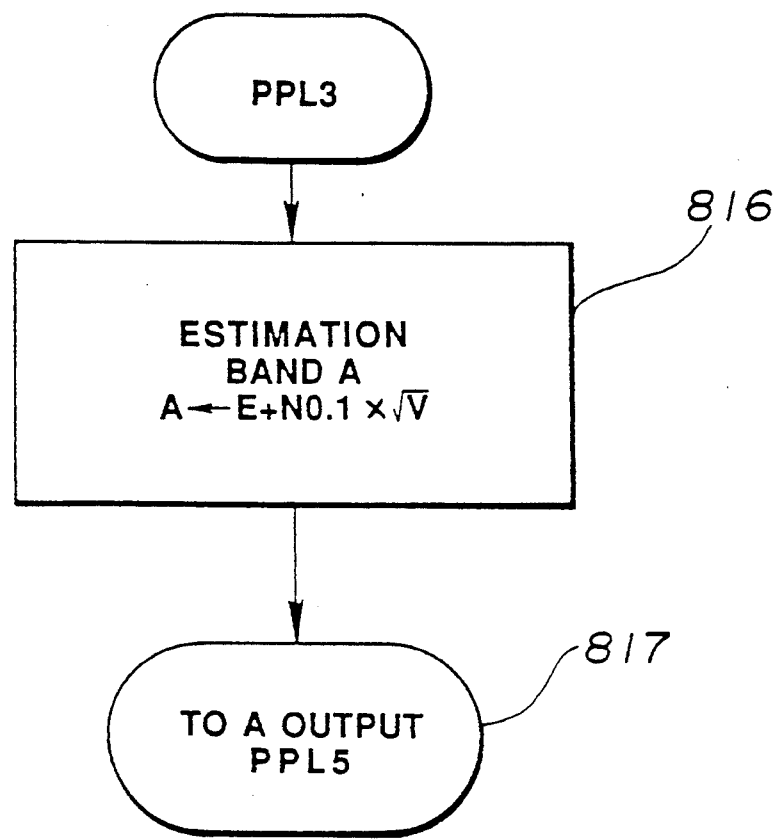

When receiving an input from the estimation-logic judgment circuit (PPL2) 802, the normal-distribution estimation circuit (PPL3) 803 in FIG. 24 starts such a processing procedure as shown in FIG. 27. In this procedure, for performing the normal distribution estimation, the normal-distribution estimation circuit (PPL3) 803 previously registers therein a significance level ($\alpha$) as a value 803a of the significance level. The normal-distribution estimation circuit (PPL3) 803 first finds a reference normal-distribution value (N 0.1) through the retrieval of a value of a reference normal-distribution table (N 0.1 table 803b) of FIG. 30 corresponding to the significance level $\alpha$ value 803a.

In the retrieval example of FIG. 30, when $\alpha$ is set at 0.01, the $\alpha$ approximation is carried out with 0.01 to 1.00−0.4949×2.0 in the N 0.1 table to thereby find N 0.1=2.57.

Thereafter, the normal-distribution estimation circuit (PPL3) 803 calculates an estimate (A) of the multiplex packet rate based on the normal distribution in accordance with the following equation with use of the found N 0.1 value as well as the multiplex mean value (E) and multiplex variance value (V) received from the estimation-logic judgment circuit (PPL2) 802 (step 816) and sends the calculated result to the input-call acceptance judgment circuit (PPL5) 805 (step 817).

$$A = E + N\,0.1 \times sqrt\,(V)$$

Figure 28:
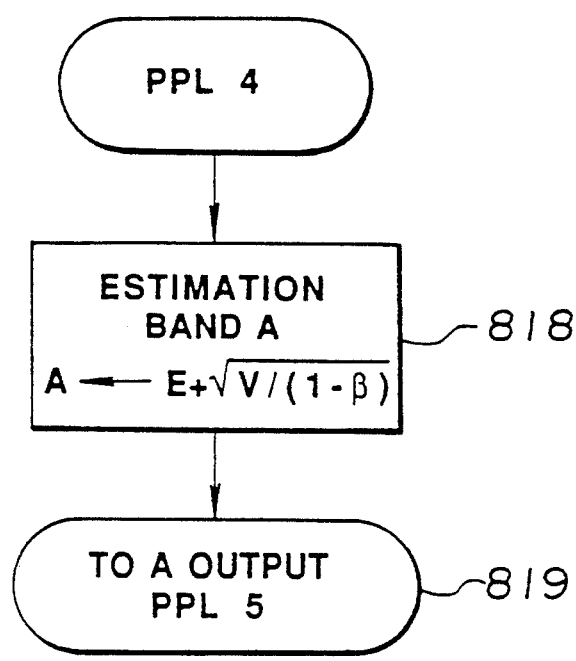

On the other hand, when the Chebyshef estimation circuit (PPL4) 804 in FIG. 24 receives an input from the estimation-logic judgment circuit (PPL2) 802, the circuit 804 starts such a processing procedure as shown in FIG. 28. In this procedure, for performing estimating operation without being affected by the distribution of Chebyshef inequality, the Chebyshef estimation circuit (PPL4) 804 previously registers therein a significance level ($\beta$) as a value 804a of the significance level ($\beta$). The Chebyshef estimation circuit (PPL4) 804 calculates an estimate (A) of the multiplex packet rate in accordance with the following equation with use of the value 804a of the significance level ($\beta$) (step 818) and sends its calculated result to the input-call acceptance judgment circuit (PPL5) 805 (step 819).

$$A = E + [V/(1-\beta)]^{\frac{1}{2}}.$$

Figure 29:
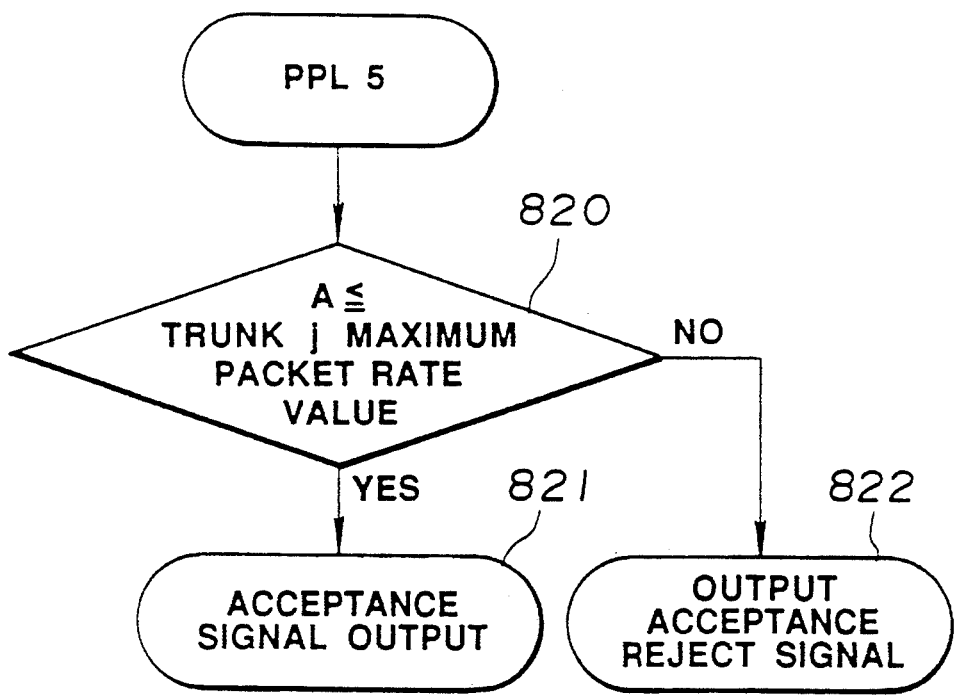

Further, when receiving an input from the normal-distribution estimation circuit (PPL3) 803 or the Chebyshef estimation circuit (PPL4) 804, the input-call acceptance judgment circuit (PPL5) 805 starts such a processing procedure as shown in FIG. 29. In this procedure, the input-call acceptance judgment circuit (PPL5) 805 compares the maximum packet rate value of the corresponding trunk previously registered in a trunk-j maximum packet rate value 805a with the estimate A received from the normal-distribution estimation circuit (PPL3) 803 or from the Chebyshef estimation circuit (PPL4) 804 (step 820). When the comparison result satisfies a condition A≦(trunk-j maximum packet rate value), the input-call acceptance judgment circuit (PPL5) 805 outputs such an acceptance signal as shown in FIG. 22 to the trunk-j registration call table 703 (step 821) to register the new input call in the table 703 and to output the calling message to the next-stage relay exchange or the call-destination exchange. When the comparison result in the step 820 does not satisfy the condition A≦(trunk-j maximum packet rate value), on the other hand, the input-call acceptance judgment circuit (PPL5) 805 outputs such an acceptance reject signal as shown in FIG. 22 (step 822) and returns a 'REL' message to the caller terminal of the new input call to cancel the call.

Explanation will next be made as to another feature of the present embodiment, that is, the correction system when an error resulting from the above estimation exceeds an expected value, by referring to FIGS. 18, 21, 22, 31 and 32. The packet exchange in the present embodiment is arranged so that packets transmitted on every trunk line basis are once accumulated in the memory of the exchange, which function may be carried out by the trunk interface 103 having such an arrangement as shown in FIG. 31.

Figure 31:
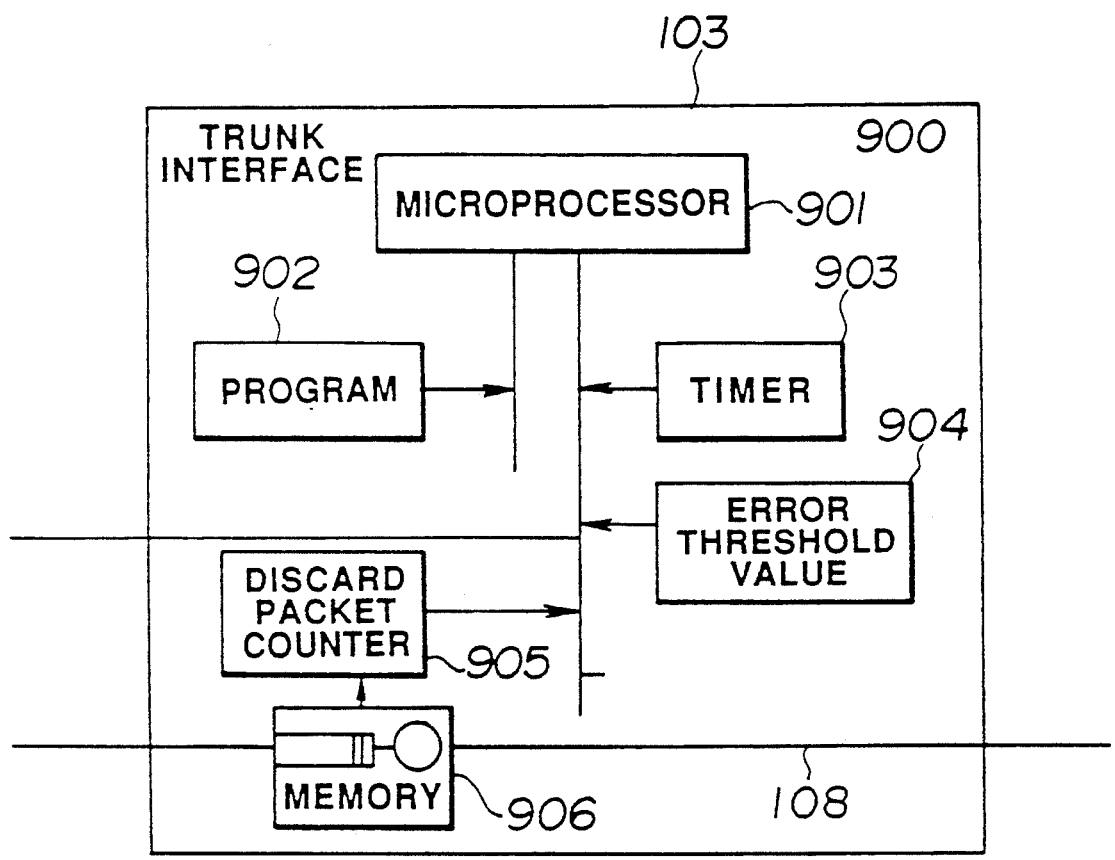
FIG. 31 is a functional block diagram showing an embodiment of the trunk interface of the present embodiment.

In FIG. 31, more specifically, packets input to the trunk interface 103 via the data line 108 are once stored in that part of a memory 906 corresponding to the corresponding trunk and when the corresponding trunk line becomes idle, the packets are output onto the corresponding trunk line.

Such a type of packet exchange is arranged so that, when the exchange receives packets exceeding the capacity of the memory 906, the exceeded packets are discarded.

Figure 32:
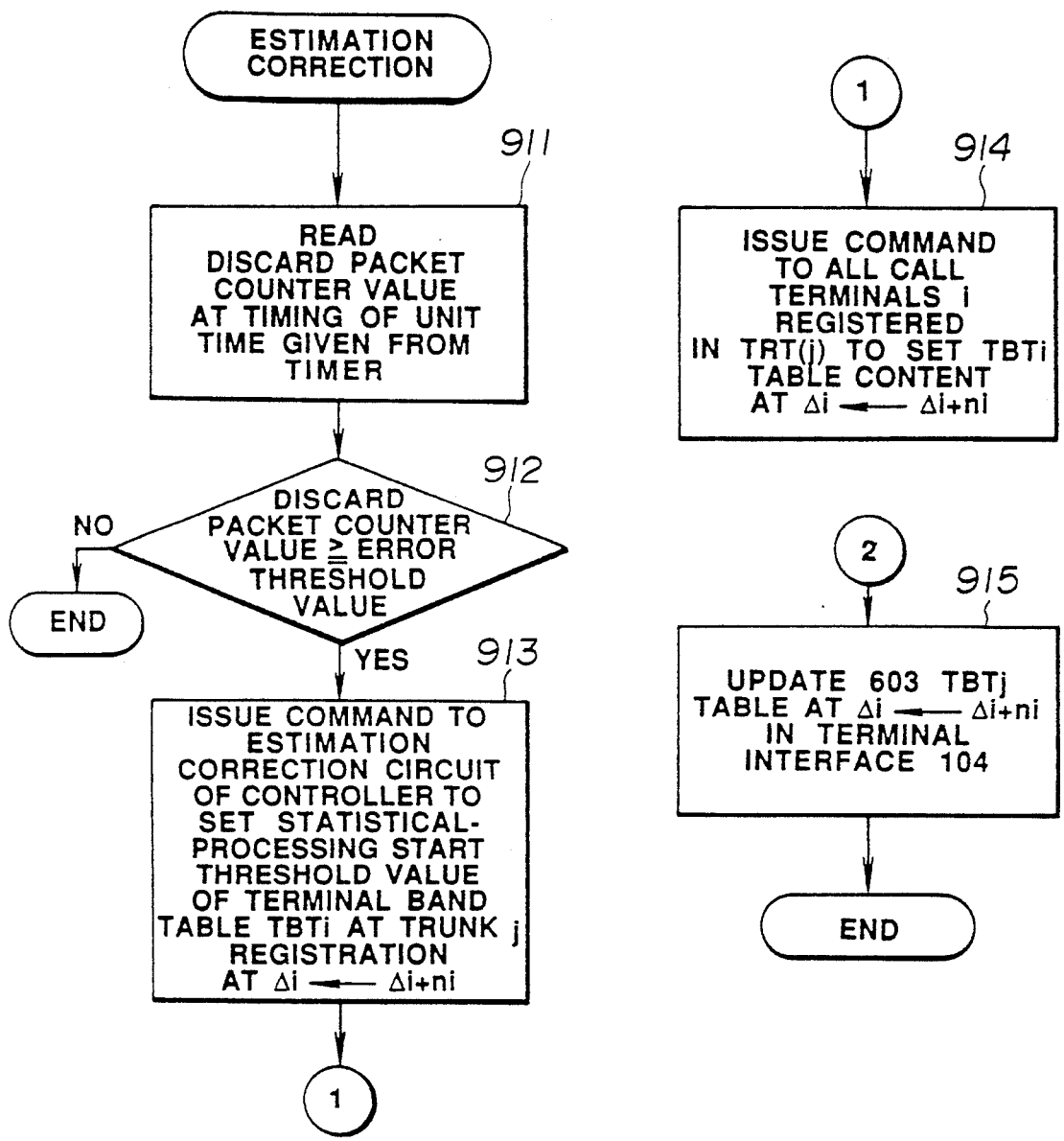
FIG. 32 is a flowchart showing the estimation correcting operation of the present embodiment.

To avoid this, in accordance with the present embodiment, a microprocessor 901 is activated under control of a program 902 according to the number of such discarded packets counted by a discarded packet counter 905 in the trunk interface 103 (refer to FIG. 31), an estimation correction circuit 706 (comprising a microprocessor and a program) in the controller 101 is activated under control of its program (refer to FIG. 22), the microprocessor 601 in the terminal interface 104 is activated under control of the program 602 (refer to FIG. 18), whereby the correcting operation is carried out following such a flowchart as shown in FIG. 32.

In the correcting operation, the microprocessor 901 reads the number of discarded packets occurred per unit time from the discard packet counter 905 at intervals of a constant time set by a timer provided in the memory 906 (the old count value of the counter 905 is cleared at the time of reading the new discard packet number) (step 911). Then the microprocessor 901 compares the read discarded-packet number per unit time with a preset error threshold value 904 (step 912).

When the discarded-packet number per unit time is equal to or larger than the error threshold value 904 (or when the accumulated number of discarded packets accumulated during a continuous unit time is equal to or larger than the error threshold value 904), the microprocessor 901 issues a command to the estimation correction circuit 706 of the controller 101 in such a manner that the estimation correction circuit 706 reads communication terminals now registered for the corresponding trunk line j from the trunk-j registration call table 703 and sets the statistical- processing start threshold value of the terminal band table TBTI at the time of registering the trunk j at $\Delta i \leftarrow \Delta i + ni$ with respect to all the read terminals and the contents of the TBTI table with respect to all the call terminals registered in the trunk-j registration call table TRT (j) are changed with $\Delta i \leftarrow \Delta i + ni$ (steps 913 and 914).

The transfer of such signal is realized by sequentially transmitting the request signal to the associated packet exchange via the internal control bus 112 when the caller terminal belongs to the packet exchange having the operated estimation correction circuit 706 or via the control signal line of the data line bus 106 when the caller terminal belongs to another packet exchange and then via the internal control bus 112.

The terminal, when receiving the request, updates the values of the terminal band table 603 in such a manner as to increase the statistical-processing start threshold values further by $\Delta i$ (which may be another preset value) from the current packet rate sample number (ni) to demand the communication band at the maximum packet rate (step 915).

In this way, through the estimation correcting operation taking the discarded-packet number into consideration, the present embodiment can further improve its estimation reliability.

As has been disclosed in the foregoing, in accordance with the present embodiment, the communication packet rate between terminals is measured, the measured sample is statistically processed to obtain mean and variance values, normal distribution is estimated from the obtained mean and variance values, and permission or non-permission of registration of the call for the specified trunk line is judged on the basis of the estimated value. As a result, the efficient use of the trunk transmission band suitable for the actual packet communication amount can be realized. Further, the statistical processing is started when the number of packet rate samples measured at a terminal becomes sufficiently large, prior to which the maximum packet rate is used as its communication band value. As a result, abnormal estimation resulting from a sufficient number of samples can be avoided.

Furthermore, methods for estimating the multiplex packet rate of the trunk line for a terminal are selected in such a manner that when approximation is realized as the normal distribution, the approximate value based on the normal distribution can be used, while otherwise the calculated band value based on the generally-established Chebyshef inequality can be used. As a result, suitable estimation can be realized flexibly according to the size of the number of terminals registered for the trunk line.

In addition, when an abnormal estimation is detected, the correcting operation of the estimate value is provided for setting the communication band value of the corresponding terminal at the maximum packet rate, thus contributing to additional improvement of the estimation reliability.

What is claimed is:

1. A connection type exchange which, prior to a communication between terminals, determines a communication path and a communication channel in accordance with previously registered call data for performing actual packet communication, comprising:

a trunk interface connected to a trunk line;

medium pattern memory means for storing, in correspondence with the trunk interface, medium patterns indicative of combinations of communication media of the terminal corresponding to the registered call data;

limit medium pattern memory means for storing, in correspondence with the trunk interface, limit medium patterns used as bases for judging whether a new call is to be accepted or not;

call acceptance judging means for comparing the medium patterns stored in the medium pattern memory means and the limit medium patterns stored in the limit medium pattern memory means to judge whether the new call is to be accepted or not;

communication channel establishing means for establishing a communication channel between the terminals so that the terminals may exchange data when said call acceptance judging means judges that the new call is to be accepted;

communication packet number measuring means provided in the trunk interface for measuring the number of communication packets per unit time; and learning means for estimating a normal distribution value of the number of communication packets in the actual packet communication corresponding to the medium patterns stored in the medium pattern memory means on the basis of the measured value of the communication packet number measuring means and updating the limit medium patterns stored in the limit medium pattern memory means in correspondence with the estimated normal distribution value.

2. An exchange as set forth in claim 1, wherein the learning means comprises:

means value calculating means for calculating a mean value of the number of communication packets per unit time;

estimate coefficient memory means for storing an estimate coefficient used for estimating the normal distribution;

standard deviation value calculating means for calculating a standard deviation value of the number of communication packets per unit time; and normal distribution estimate value calculating means for calculating a normal distribution estimate value on the basis of the mean value of the number of communication packets per unit time calculated by the means value calculating means, the estimate coefficient stored in the estimate coefficient memory means and the standard deviation value calculated by the standard deviation value calculating means.

3. An exchange as set forth in claim 2, wherein the normal distribution estimate value calculating means calculates the normal distribution estimate value in accordance with an equation:

{normal distribution estimate value=(means value of the number of communication packets per unit time)+(estimate coefficient)×(standard deviation value of the number of communication packets per unit time)}.

4. An exchange as set forth in claim 1, wherein the learning means comprises:

first memory means for storing a distribution value $t(N-1, \alpha_1)$, when a freedom degree is $N-1$ and a significant level is $\alpha_1$;

second memory means for storing a distribution value $\chi^2(N-1, 1-\alpha_2/2)$, when the freedom degree is $N-1$ and the significant level is $1-\alpha_2/2$;

third memory means for storing a normal distribution value $N(\alpha_3)$, when the significant level is $\alpha_3$;

first calculating means for calculating a sample mean value Xave of N numbers of sample values of (X1, X2, . . . , XN) measured by the communication packet number measuring means in accordance with the equation $$Xave = 1/N \cdot \sum_{i=1}^{N} Xi;$$

second calculating means for calculating an unbiased variance value $u^2$ of N numbers of the sample values of (X1, X2, . . . , XN) measured by the communication packet number measuring means in accordance with an equation $$u^2 = 1/(N-1) \cdot \sum_{i=1}^{N} (Xi - Xave)^2;$$

third calculating means for calculating a means $\mu$ of a population in accordance with an equation $$\mu = Xave + t(N-1, \alpha_1) \cdot u/N^{\frac{1}{2}},$$

when the significant level is $\alpha_1$;

fourth calculating means for calculating a variance $\sigma^2$ of the population in accordance with an equation $$\sigma^2 = u^2(N-1)/\chi^2(N-1, 1-\alpha_2/2),$$

when the significant level is $\alpha_2$;

fifth calculating means for calculating an estimate value A of the number of communication packets per unit time corresponding to the medium patterns in accordance with an equation $A = \mu + N(\alpha_3) \cdot \sigma$, when the significant level is $\alpha_3$;

sixth calculating means for calculating a residual trunk capacity value R of the trunk line by subtracting the estimate value A from a maximum value of the number of communication packets per unit time of the trunk line; and updating means, when the medium patterns stored in the medium pattern memory means reach the limit medium patterns stored in the limit medium pattern memory means, for obtaining all of new limit medium patterns in which the residual trunk capacity value R calculated by the sixth calculating means take values near to zero and updating the limit medium patterns stored in the limit medium pattern memory means by the new limit medium patterns.

5. An exchange as set forth in claim 4, wherein the learning means includes medium/reference packet rate memory means for storing the number of communication packets per unit time in association with each medium, and wherein the updating means obtains the new limit medium patterns by referencing to the number of communication packets per unit time associated with each medium stored in the medium/reference packet rate memory means.

6. A method of controlling a connection type exchange including trunk interface connected to a trunk line, medium pattern memory means for storing, in correspondence with the trunk interface, medium patterns indicative of combinations of communication media of terminals corresponding to previously registered call data and limit medium pattern memory means for storing, in correspondence with the trunk interface, limit medium patterns used as bases for judging whether a new call is to be accepted or not, wherein the exchange performs an actual packet communication after determining a communication path and a communication channel in accordance with the previously registered call data prior to a communication between the terminals; the method comprising the steps of:

measuring, when the medium patterns stored in the medium pattern memory means reach the limit medium patterns stored in the limit medium pattern memory means, the number of communication packets per unit time in the trunk interface;

estimating a normal distribution value of the number of communication packets in the actual packet communication corresponding to the medium patterns stored in the medium pattern memory means on the basis of the measured number of communication packets per unit time;

obtaining communicable new limit medium patterns in correspondence with the estimated normal distribution value;

updating the limit medium patterns stored in the limit medium pattern memory means by the obtained new limit medium patterns;

comparing the medium patterns stored in the medium pattern memory means and the limit medium patterns stored in the limit medium pattern memory means to judge whether the new call is to be accepted or not; and controlling the connection type exchange to establish a communication channel between the terminals so that the terminals may exchange data when judgment is made that the new call is to be accepted.

7. A connection type exchange which, prior to a communication between terminals, determines a communication path and a communication channel through each trunk line in accordance with previously registered call data for performing actual packet communication, comprising:

a plurality of terminal interfaces each connected to one of the terminals;

measuring means provided in each terminal interface for measuring the number of communication packets per unit time from the terminal;

first memory means provided in each terminal interface for storing a mean value and a variance value of the number of communication packets from the terminal, the mean value and the variance value being calculated on the basis of the number of communication packets measured by the measuring means;

second memory means for storing a means value and a variance value of the number of communication packets from the terminal corresponding to all of calls already registered in the trunk line;

estimating means for receiving the mean value and the variance value of the number of communication packets from the terminal, which are stored in the first memory means, and the mean value and the variance value of the number of communication packets from the terminal corresponding to all of the calls already registered in the trunk line, which are stored in the second memory means, and estimating an operational transmission band of the trunk line on the basis of the received means values and variance values;

call acceptance judging means for judging whether a new call is to be accepted or not by comparing the operational transmission band of the trunk line estimated by the estimating means and a maximum operation transmission band of the trunk line; and communication channel establishing means for establishing a communication channel between the terminals so that the terminals may exchange data when said call acceptance judging means judges that the new call is to be accepted.

8. An exchange as set forth in claim 7, wherein the estimating means comprises:

multiplex mean value calculating means for calculating a multiplex means value E of the number of communication packets of the trunk line by adding the means value $Ei'$ of the number of communication packets of the new call, which is stored in the first memory means, to a sum value $\Sigma Ei$ of the mean value $Ei$ of the number of communication packets from the terminal corresponding to all of calls already registered in the trunk line, which is stored in the second memory means;

multiplex variance value calculating means for calculating a multiplex variance value V of the number of communication packets of the trunk line by adding the variance value $Vi'$ of the number of communication packets of the new call, which is stored in the first memory means, to a sum value $\Sigma Vi$ of the variance value $Vi$ of the number of communication packets from the terminal corresponding to all of the calls already registered in the trunk line, which is stored in the second memory means;

maximum variance value detecting means for detecting a maximum variance value $max(Vi,Vi')$ of the variance value $Vi$ of the number of communication packets from the terminal corresponding to all of the calls already registered in the trunk line, which is stored in the second memory means, and the variance value $Vi'$ of the number of communication packets of the new call, which is stored in the first memory means;

comparing means for comparing a ratio of the multiplex variance value V calculated by the multiplex variance value calculating means and the maximum variance value $max(Vi,Vi')$ detected by the maximum variance value detecting means with an estimate threshold value being previously set;

first estimating means, if the comparing means judges that the ratio of the multiplex variance value V and the maximum variance max(Vi,Vi') is larger than the estimate threshold value, for calculating an estimate value of a multiplex packet rate in the normal distribution by using the multiplex mean value E calculated by the multiplex means value calculating means and the multiplex variance value V calculated by the multiplex variance value calculating means; and second estimating means, if the comparing means judges that the ratio of the multiplex variance value V and the maximum variance max(Vi,Vi') is smaller than the estimate threshold value, for calculating the estimate value of the multiplex packet rate in accordance with a Chebyshev's inequality by using the multiplex mean value E calculated by the multiplex means value calculating means and the multiplex variance value V calculated by the multiplex variance value calculating means.

9. An exchange as set forth in claim 8, wherein the first estimating means comprises:

significant level memory means for storing a significant level $\alpha$ to be allowable for the normal distribution estimation;

reference normal distribution value memory means for storing a reference normal distribution value $a(\alpha)$ corresponding to the significant level stored in the significant level memory means; and means for obtaining the reference normal distribution value $a(\alpha)$ corresponding to the significant level stored in the significant level memory means by retrieving the reference normal distribution value memory means and calculating the estimate value A of the multiplex packet rate by executing an equation $A = E + a(\alpha) \times V^{\frac{1}{2}}$ by using the reference normal distribution value $a(\alpha)$, the multiplex mean value E calculated by the multiplex mean value calculating means and the multiplex variance value V calculated by the multiplex variance value calculating means.

10. An exchange as set forth in claim 8, wherein the second estimating means comprises:

significant level memory means for storing a significant level $\beta$ to be allowable for the Chebyshev's inequality estimation; and means for calculating the estimate value A of the multiplex packet rate by executing an equation $A = E + [V/(1-\beta)]^{\frac{1}{2}}$ by using the significant level $\beta$ stored in the significant level memory means, the multiplex mean value E calculated by the multiplex mean value calculating means and the multiplex variance value V calculated by the multiplex variance value calculating means.

11. An exchange as set forth in claim 7, wherein the first memory means previously stores a maximum packet number Bi calculated from bit clock values given to the terminal as initial values of the means value Ei and the variance value Vi of the number of communication packets from the terminal, a statistical-processing start threshold value $\Delta i$ and a measuring frequency ni of the number of communication packets per unit time from the terminal, the first memory, if the measuring frequency ni does not reach the statistical-processing start threshold value $\Delta i$, stores the maximum packet number Bi as the mean value Ei and a value zero as the variance value Vi and, if the measuring frequency ni exceeds the statistical-processing start threshold value $\Delta i$, stores an arithmetic means value of the number of communication packets per unit time measured by the measuring means as the mean value Ei and the unbiased variance of the number of communication packets per unit time measured by the measuring means as the variance value Vi.

12. An exchange as set forth in claim 11 further including:

discard packet number measuring means for measuring the number of discard packets per unit time discarded due to a transmission band over of the trunk line; and means, if the measured value of the discard packet number measuring means exceeds a previously set error threshold value, for rewriting the statistical-processing start threshold value $\Delta i$ stored in the first memory means to be a larger value than the measuring frequency ni stored in the first memory means.

13. A method of controlling a connection type exchange including a plurality of terminal interfaces each connected to a terminal, measuring means provided in each terminal interface for measuring the number of communication packets per unit time, first memory means provided in each terminal interface for storing a mean value and a variance value of the number of communication packets from the terminal, the means value and the variance value being calculated on the basis of the number of communication packets measured by the measuring means, and second memory means for storing a mean value and a variance value of the number of communication packets from the terminal corresponding to all of calls already registered in a trunk line, wherein the exchange, prior to a communication between the terminals, determined a communication path and a communication channel through each terminal in correspondence with previously registered call data for performing actual packet communication, the method comprising the steps of:

when a new call is issued from the terminal, estimating an operational transmission band of the trunk line on the basis of the mean value and the variance value of the number of communication packets from the terminal, which are stored in the first memory means, and the mean value and the variance value of the number of communication packets from the terminal corresponding to all of the calls already registered in the trunk line, which are stored in the second memory means;

judging whether a new call is to be accepted or not by comparing the operational transmission band of the trunk line estimated in the estimating step and a maximum operational transmission band of the trunk line; and controlling the connection type exchange to establish a communication channel between the terminals so that the terminals may exchange data when judgment is made that the new call is to be accepted.

14. A method as set forth in claim 13, wherein the estimating step comprises the steps of:

calculating a multiplex mean value E of the number of communication packets of the trunk line by adding the mean value Ei' of the number of communication packets of the new call, which is stored in the first memory means, to a sum value $\Sigma Ei$ of the mean value Ei of the number of communication packets from the terminal corresponding to all of calls already registered in the trunk line, which is stored in the second memory means;

calculating a multiplex variance value V of the number of communication packets of the trunk line by adding the variance value Vi' of the number of communication packets of the new call, which is stored in the first memory means, to a sum value ΣVi of the variance value Vi of the number of communication packets from the terminal corresponding to all of the calls already registered in the trunk line, which is stored in the second memory means;

detecting a maximum variance value max(Vi,Vi') of the variance value Vi of the number of communication packets from the terminal corresponding to all of the calls already registered in the trunk line, which is stored in the second memory means, and the variance value Vi' of the number of communication packets of the new call, which is stored in the first memory means;

comparing a ratio of the calculated multiplex variance value V and the detected maximum variance value max (Vi,Vi') with an estimate threshold value being previously set;

calculating, if it is judged in the comparing step that the ratio of the multiplex variance value V and the maximum variance max(Vi,Vi') is larger than the estimate threshold value, an estimate value of a multiplex packet rate in the normal distribution by using the multiplex mean value E and the multiplex variance value V; and calculating, if it is judge in the comparing step that the ratio of the multiplex variance value V and the maximum variance value max(Vi,Vi') is smaller than the estimate threshold value, the estimate value of the multiplex packet rate in accordance with the Chebyshev's inequality by using the multiplex mean value E and the multiplex variance value V.

* * * * *